US010621200B2

(12) United States Patent
Merriman et al.

(10) Patent No.: US 10,621,200 B2
(45) Date of Patent: *Apr. 14, 2020

(54) METHOD AND APPARATUS FOR MAINTAINING REPLICA SETS

(71) Applicant: MongoDB, Inc., New York, NY (US)

(72) Inventors: Dwight Merriman, New York, NY (US); Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 615 days.

This patent is subject to a terminal disclaimer.

(21) Appl. No.: 15/074,987

(22) Filed: Mar. 18, 2016

(65) Prior Publication Data

US 2016/0203202 A1 Jul. 14, 2016

Related U.S. Application Data

(63) Continuation of application No. 14/064,705, filed on Oct. 28, 2013, now Pat. No. 9,317,576, which is a
(Continued)

(51) Int. Cl.
*G06F 16/27* (2019.01)
*G06F 11/07* (2006.01)
(Continued)

(52) U.S. Cl.
CPC ........ *G06F 16/273* (2019.01); *G06F 11/0709* (2013.01); *G06F 11/0793* (2013.01);
(Continued)

(58) Field of Classification Search
CPC .. G06F 11/0709; G06F 11/1469; G06F 16/27; G06F 16/273
(Continued)

(56) References Cited

U.S. PATENT DOCUMENTS 4,918,593 A  4/1990 Huber
5,379,419 A  1/1995 Heffernan et al.
(Continued)

OTHER PUBLICATIONS

U.S. Appl. No. 14/064,705, filed Oct. 28, 2013, Merriman.
(Continued)

*Primary Examiner* — William Spieler
(74) *Attorney, Agent, or Firm* — Wolf, Greenfield & Sacks, P.C.

(57) ABSTRACT

Provided are systems and methods for managing asynchronous replication in a distributed database environment, wherein a cluster of nodes are assigned roles for processing database requests. In one embodiment, the system provides a node with a primary role to process write operations against its database, generate an operation log reflecting the processed operations, and permit asynchronous replication of the operations to at least one secondary node. In another embodiment, the primary node is the only node configured to accept write operations. Both primary and secondary nodes can process read operations. Although in some settings read requests can be restricted to secondary nodes or the primary node. In one embodiment, the systems and methods provide for automatic failover of the primary node role, can include a consensus election protocol for identifying the next primary node. Further, the systems and methods can be configured to automatically reintegrate a failed primary node.

25 Claims, 13 Drawing Sheets

Related U.S. Application Data continuation of application No. 12/977,563, filed on Dec. 23, 2010, now Pat. No. 8,572,031.

(51) Int. Cl.
*G06F 16/23* (2019.01)
*G06F 11/14* (2006.01)

(52) U.S. Cl.
CPC ...... *G06F 11/1458* (2013.01); *G06F 16/2365* (2019.01); *G06F 2201/84* (2013.01)

(58) Field of Classification Search
USPC .......................................... 707/615; 709/225
See application file for complete search history.

(56) References Cited

U.S. PATENT DOCUMENTS

| | | | |
|---|---|---|---|
| 5,416,917 A | 5/1995 | Adair et al. |
| 5,471,629 A | 11/1995 | Risch |
| 5,551,027 A | 8/1996 | Choy et al. |
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A * | 5/2000 | Barker ................ G06F 11/1402 |
| 6,088,524 A | 7/2000 | Levy et al. |
| 6,112,201 A | 8/2000 | Wical |
| 6,115,705 A | 9/2000 | Larson |
| 6,240,406 B1 | 5/2001 | Tannen |
| 6,249,866 B1 | 6/2001 | Brundett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,496,843 B1 | 12/2002 | Getchius et al. |
| 6,505,187 B1 | 1/2003 | Shatdal |
| 6,611,850 B1 | 8/2003 | Shen |
| 6,687,846 B1 | 2/2004 | Adrangi et al. |
| 6,691,101 B2 | 2/2004 | MacNicol et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 | 10/2005 | Ashton et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,467,103 B1 | 12/2008 | Murray et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,668,801 B1 | 2/2010 | Koudas et al. |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,082,265 B2 | 12/2011 | Carlson et al. |
| 8,086,597 B2 | 12/2011 | Balmin et al. |
| 8,099,572 B1 | 1/2012 | Arora et al. |
| 8,103,906 B1 | 1/2012 | Alibakhsh et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,321,558 B1 | 11/2012 | Sirota et al. |
| 8,352,450 B1 | 1/2013 | Mraz et al. |
| 8,352,463 B1 | 1/2013 | Nayak |
| 8,363,961 B1 | 1/2013 | Ayidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,572,031 B2 | 10/2013 | Merriman et al. |
| 8,589,382 B2 | 11/2013 | Betawadkar-Norwood |
| 8,589,574 B1 * | 11/2013 | Cormie ............ G06F 17/30094 709/230 |
| 8,615,507 B2 | 12/2013 | Varadarajulu et al. |
| 8,712,993 B1 | 4/2014 | Ordonez |
| 8,751,533 B1 | 6/2014 | Dhavale et al. |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 * | 4/2015 | Resch .................. H04L 12/00 711/161 |
| 9,069,827 B1 | 6/2015 | Rath et al. |
| 9,116,862 B1 | 8/2015 | Rath et al. |
| 9,183,254 B1 | 11/2015 | Cole et al. |
| 9,262,462 B2 | 2/2016 | Merriman et al. |
| 9,274,902 B1 | 3/2016 | Morley et al. |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,660,666 B1 | 5/2017 | Ciarlini et al. |
| 9,740,762 B2 | 8/2017 | Horowitz et al. |
| 9,792,322 B2 | 10/2017 | Merriman et al. |
| 9,805,108 B2 | 10/2017 | Merriman et al. |
| 9,881,034 B2 | 1/2018 | Horowitz et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,394,822 B2 | 8/2019 | Stearn |
| 10,423,626 B2 | 9/2019 | Stearn et al. |
| 2001/0021929 A1 | 9/2001 | Lin et al. |
| 2002/0029207 A1 | 3/2002 | Bakalash et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2003/0046307 A1 | 3/2003 | Rivette et al. |
| 2003/0088659 A1 | 5/2003 | Susarla et al. |
| 2003/0182427 A1 * | 9/2003 | Halpern ............ G06F 9/4843 709/226 |
| 2003/0187864 A1 | 10/2003 | McGoveran |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0288232 A1 | 12/2006 | Ho et al. |
| 2006/0294129 A1 | 12/2006 | Stanfill et al. |

(56) References Cited

U.S. PATENT DOCUMENTS

| | | |
|---|---|---|
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0203944 A1 | 8/2007 | Batra et al. |
| 2007/0226640 A1 | 9/2007 | Holbrook et al. |
| 2007/0233746 A1* | 10/2007 | Garbow .............. H04L 67/1095 |
| 2007/0240129 A1 | 10/2007 | Kretzschmar et al. |
| 2008/0002741 A1 | 1/2008 | Maheshwari et al. |
| 2008/0071755 A1 | 3/2008 | Barsness et al. |
| 2008/0098041 A1 | 4/2008 | Chidambaran et al. |
| 2008/0140971 A1 | 6/2008 | Dankel et al. |
| 2008/0162590 A1* | 7/2008 | Kundu ................ G06F 11/1471 |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0235606 A1 | 9/2010 | Oreland et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0198200 A1 | 8/2012 | Li et al. |
| 2012/0221540 A1 | 8/2012 | Rose et al. |
| 2012/0254175 A1 | 10/2012 | Horowitz |
| 2012/0274664 A1 | 11/2012 | Fagnou |
| 2012/0320914 A1 | 12/2012 | Thyni et al. |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162374 A1 | 6/2016 | Mutha et al. |
| 2016/0188377 A1 | 6/2016 | Thimmappa et al. |
| 2016/0246861 A1 | 8/2016 | Merriman et al. |
| 2016/0306709 A1 | 10/2016 | Shaull |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |

OTHER PUBLICATIONS

Chang et al., Bigtable: a distributed stoarge system for structured data. OSDI'06: Seventh Symposium on Operating System Design and Implementation. Nov. 2006.

Cooper et al., PNUTS: Yahoo !'s hosted data serving platform. Proceedings of the VLDB Endowment. Aug. 2008.

Decandia et al., Dynamo: Amazon's highly available key-value store. SOSP 2007. Oct. 2004.

Migrate DB2 applications to a partitioned Database IBM, Apr. 24, 2008.

Renesse et al., Chain replication for supporting high throughput and availability. OSDI. 2004: 91-104.

Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

Nelson et al., Automate MongoDB with MMS. PowerPoint Presentation. Published Jul. 24, 2014. 27 slides. http://www.slideshare.net/mongodb/mms-automation-mongo-db-world.

(56) References Cited

OTHER PUBLICATIONS

Poder, Oracle living books. 2009. <http://tech.e2sn.com/oracle/sql/oracle-execution-plan-operation-reference >.
Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.

* cited by examiner

METHOD AND APPARATUS FOR MAINTAINING REPLICA SETS

RELATED APPLICATIONS

This application is a continuation of and claims priority under 35 U.S.C. § 120 to U.S. application Ser. No. 14/064,705 entitled "METHOD AND APPARATUS FOR MAINTAINING REPLICA SETS," filed Oct. 28, 2013; which is a continuation of and claims priority under 35 U.S.C. § 120 to U.S. application Ser. No. 12/977,563, now U.S. Pat. No. 8,572,031, entitled "METHOD AND APPARATUS FOR MAINTAINING REPLICA SETS," filed Dec. 23, 2010, which are incorporated herein by reference in the entirety.

BACKGROUND

The present invention relates to distributed database systems and methods for implementing asynchronous replication with automatic failover and/or automatic reintegration of failed systems. Conventional database architectures are designed to provide for reliable processing of database transactions, such as read and write operations performed on the database. Different database architecture designs stress different aspects of the well-known ACID properties (atomicity, consistency, isolation, durability), and such designs typically provide trade-offs between the properties and/or processing concerns based on which properties are stressed. As the demand for processing power and speed has increased, data stores have been developed to provide scaling of databases across a number of systems, vastly increasing the capability of handling large volumes of requests. Ecommerce websites, in particular, have vast need of quick and reliable processing of transactions. Moreover, such websites typically need to be capable of processing transactions even while the systems that host the data store are failing or losing connectivity with the service hosting the website.

In typical distributed database systems, no single node is responsible for all data affecting a transaction. Distribution of responsibility introduces significant additional complexity to ensure such ACID properties are fulfilled by the database design. Communication failures, failures of individual nodes, and inconsistent transactions all present additional complexity in reliable processing of database transactions. Some conventional approaches resolve some of these reliability issues by separating responsibility for read and write operations among elements of a distributed database. For example, master-slave relationships can be established between nodes in a distributed database. The well-known MySQL database is configured for master-slave replication of database instances. In the MySQL database, processing of write requests can be limited to the master system which can then propagate changes to its slave systems. The slave systems are then used to respond to read requests, permitting a large volume of read operations to occur across an easily scalable number of systems. Known trade-offs occur in such a setting, for example write processing capability is limited. Master-slave architectures are best suited for settings that require large volumes of read operations and a smaller number of write operations.

Other systems provide for multiple nodes within a data store that can process write requests, replicate their data to other nodes, and respond to read requests. For example, the well-known Amazon Dynamo database system provides an architecture that employs keys to determine a set of nodes that can process writes and reads for particular data. The Dynamo system emphasizes availability of data over other concerns, including consistency. By always permitting write operations whenever possible, conflicting transactions can and do arise. Thus, the Dynamo system requires implementation of reconciliation logic for conflicting transactions in the database and may require vector clocks, for example, to associate timing information with various updates. The timing information can then be processed to resolve conflicting operations.

SUMMARY

It is realized that methods and systems are needed to address some of the shortcomings of conventional distributed database approaches. In particular, there is a need for a database system that provides consistency and simplicity in an eventually consistent setting. An eventually consistent database refers to one where replication of database changes can occur asynchronously, and thus when write operations cease, all replicas of a database will eventually become consistent.

In one embodiment, simplicity and consistency can be achieved by establishing a primary node in a plurality of nodes hosting database instances. The primary node is responsible for accepting write operations and propagating them to the secondary nodes in its replica set. An example replica set includes a cluster of nodes that host a database. The replica set contains a node with a primary role that can transition between nodes of the cluster. The remaining nodes can be assigned a secondary role and host replicas of the primary node's database. A database and/or data store can be made up of multiple replica sets each set having its own primary node. The secondary nodes share the responsibility of responding to read requests.

In one embodiment, replica sets can be configured to provide for failover of a primary node, by automatically electing a new primary node from within the replica set. In one example implementation, a new primary can be elected by a majority of the nodes in the set. The new primary establishes a new point of consistency for the database based on its current state (potentially requiring roll back of uncommitted transactions) and provides for processing of any new transactions seamlessly. Simplicity can be achieved in this setting while maintaining consistency by permitting uncommitted write operations to be removed in the event of primary node failures. Further, permitting uncommitted write operations to be removed can permit even strongly consistent behavior. As discussed in greater detail below, automatic failover in response to replication errors solves some of the issues presented in conventional approaches, permits maintaining consistency in the database during failover, in some examples by accepting data loss. In some examples, such configurations can reduce some of the complexity associated with other conventional systems.

According to another aspect, a distributed database system comprises a plurality of nodes that host database instances, where each node is intended to host a copy of a database. Primary nodes are elected from within the plurality of nodes. In one example, a primary node is elected using a consensus protocol. A consensus protocol can include querying the plurality of nodes to determine the node with the freshest data. Once a majority of nodes agree on the best node, consensus exists and the node is elected primary. Various consensus protocols can be configured to elect on different criteria including freshest data, best location, most robust hardware, among other options.

A primary node is configured to accept write operations received from client systems. Changes to the primary node database can be written to an operation log and the operations are then propagated asynchronously to secondary nodes hosting replicas of the primary node's database. In some settings, a replica set comprising the plurality of nodes can be configured to wait to acknowledge a write request until a threshold number of secondary nodes have replicated the data associated with the write request. Acknowledged writes can permit a client to know that a particular write request will not be lost. That is, the write operation is durable even in the event of failures in the replica set.

In some examples, the threshold number of secondary nodes required to acknowledge a write can be configured to require that a majority of the nodes responsible for the written data have applied the write operation, providing strongly consistent operation. Further, a threshold for committing an operation at a primary node can be established to require that a majority of nodes responsible for the written data have performed a replication of the operation prior to acknowledging the write request. Writes can be considered durable (retained even during node failure) upon reaching a majority of the responsible nodes and these durable writes will not be lost even upon partitions and/or failures of nodes within the distributed database.

According to one aspect of the present, a computer-implemented method for asynchronous replication in a distributed database system is provided. The method comprises acts of establishing a primary node within a plurality of nodes, wherein the plurality of nodes comprise the distributed database system and the distributed database system provides responses to database requests from client computer systems, restricting processing of write operations to the primary node, establishing at least one secondary node which hosts a replica of the primary node database from the plurality of nodes, replicating, asynchronously, from the primary node the write operations to the at least two secondary nodes, and automatically recovering the primary node role in the distributed database system in response to a failure of the primary node, wherein the act of automatically recovering includes an act of establishing one of the at least one secondary node as the primary node. According to one embodiment of the present invention, the method further comprises an act of providing for strong consistency in the distributed database system. According to another embodiment of the invention, the method further comprises an act of providing for immediate consistency in the distributed database system. According to another embodiment of the invention, the act of automatically recovering the primary node responsibility further comprises the acts of detecting by at least one node in the plurality of nodes a replication failure, electing automatically, in response to the act of detecting, a new primary node from the plurality of nodes, establishing for the new primary node at least one secondary node to replicate operations, and synchronizing a state of a respective database hosted on each of the secondary nodes with a state of the database hosted on the new primary node.

According to one embodiment of the present invention, the method further comprises an act of transitioning a state of the primary node in response to the act of detecting the replication failure. According to another embodiment of the invention, the original primary node transitions to a recovery state. According to another embodiment of the invention, the method further comprises an act of restoring the original primary node to the database system, wherein the act of restoring includes an act of identifying a consistent state in the database hosted on the original primary node and the new primary node. According to another embodiment of the invention, the act of identifying the consistent state includes an act of identifying a database state of the new primary node where the database state establishes a last committed write operation received from the original primary node. According to another embodiment of the invention, the act of restoring includes an act of reversing transactions for the database hosted on the original primary node to reach the consistent state. According to another embodiment of the invention, the method further comprises an act of applying any transactions from the database hosted on the new primary node to the database hosted on the original primary node. According to another embodiment of the invention, the method further comprises an act of transitioning the state of the original primary node to an active state as a secondary node. According to another embodiment of the invention, the act of electing the new primary node includes an act of establishing a consensus within the plurality of nodes. According to another embodiment of the invention, the act of establishing a consensus includes an act of requiring a majority of the plurality of nodes to agree on the new primary node.

According to one embodiment of the present invention, the method further comprises an act of voting by at least one node in the plurality of nodes for the new primary node. According to another embodiment of the invention, the act of voting by the at least one node in the plurality of nodes for the new primary node includes an act of determining a priority value for the at least one node. According to another embodiment of the invention, the act of establishing a consensus includes acts of determining the new primary node based, at least in part, on the priority value, and resolving equal priority values based on a state of a respective database of the at least one node. According to another embodiment of the invention, the act of determining consensus is based at least in part one at least one of a priority value for a respective node, a status of a database for a respective node, a location of a respective node, and an availability measure for a respective node. According to another embodiment of the invention, the method further comprises an act of guaranteeing a write operation is not lost in response to the act of replicating occurring on a majority of nodes responsible for any written data associated with the write operation. According to another embodiment of the invention, the act of replicating from the primary node the write operations to the plurality of nodes, includes an act of committing the write operation in response to an acknowledgement of the write operation from the majority of nodes responsible for the written data. According to another embodiment of the invention, the act of replicating from the primary node the write operations to the plurality of nodes, includes an act of committing the write operation in response to an acknowledgement of the write operation from a threshold number of the nodes responsible for the written data.

According to one embodiment of the present invention, the method further comprises an act of permitting read operations from the plurality of nodes to occur with data corresponding to uncommitted write operations. According to another embodiment of the invention, the majority of nodes responsible for the written data include the primary node and at least two secondary nodes. According to another embodiment of the invention, the method further comprises an act of generating on the primary node an operation log for each processed write operation, wherein the operation log includes a unique identifier for each processed operation. According to another embodiment of the invention, the method further comprises an act of transmitting the processed write operation with the unique identifier. According to another embodiment of the invention, the unique identifier includes an identifier for the primary system and a monotonically increasing value for each operation. According to another embodiment of the invention, the method further comprises an act of receiving a status signal from at least one of the plurality of nodes. According to another embodiment of the invention, the status signal provides an indication of communication state on a network connecting the plurality of nodes.

According to one embodiment of the present invention, the act of detecting the replication failure includes an act of determining that the primary node cannot communicate with a majority of the plurality of nodes based at least in part on a status signal. According to another embodiment of the invention, the method further comprises an act of generating a heartbeat signal from at least one of the plurality of nodes. According to another embodiment of the invention, the status signal provides an indication that a threshold number of nodes from the plurality of nodes have not executed the write operation. According to another embodiment of the invention, the status signal provides an indication that a threshold number of nodes from the plurality of nodes have executed the write operation. According to another embodiment of the invention, the act of synchronizing a state of a respective database hosted on each of the secondary nodes with a state of the database hosted on the new primary node, includes an act of identifying any operation on the respective node that is inconsistent with an operation on the new primary node. According to another embodiment of the invention, the act of synchronizing the state of the respective database includes an act of updating an object on the respective node that corresponds to an inconsistent operation. According to another embodiment of the invention, the act of updating includes an act of deleting the object if the object does not exist on the new primary node. According to another embodiment of the invention, the method further comprises an act of generating a comparison value associated with the state of the respective database. According to another embodiment of the invention, the method further comprises an act of establishing at least one node as a backup node, wherein the backup node is configured to maintain a copy of the database without indexes. According to another embodiment of the invention, the method further comprises an act of generating different indexes for at least one of the secondary nodes hosting the database replica.

According to one aspect of the present invention, a system for performing asynchronous replication in a distributed database environment comprising a plurality of nodes is provided. The system comprises a role component configured to establish a role associated with each node in a plurality of nodes, wherein the role component is configured to establish a primary node with a primary role and at least one secondary node with a secondary role, an execution component configured to restrict write requests to the primary node, a replication component configured to asynchronously replicate write operations performed on the primary node to the at least one secondary node, and a recovery component configured to automatically establish a new primary node in the distributed database system in response to a replication failure, wherein the recovery component is further configured to establish one of the at least one secondary node as the primary node. According to one embodiment of the present invention, the system further comprises a durability component configured to commit a write operation in response to replication of the write operation to a threshold number of the nodes responsible for the written data. According to another embodiment of the invention, the threshold number of the nodes responsible for the written data comprises a majority of the nodes responsible for the written data. According to another embodiment of the invention, the majority of nodes responsible for the written data include the primary node and at least two secondary nodes. According to another embodiment of the invention, the recovery component further comprises a status component configured to monitor replication status in the distributed database an election component configured to automatically establish a new node with the primary role in response to detecting a replication failure, and a synchronization component configured to synchronize a database hosted on the at least one node with the secondary role and a database hosted on the new primary node.

According to one embodiment of the present invention, the election component is further configured to establish the new node with the primary role based on evaluation of election criteria. According to another embodiment of the invention, the election criteria includes at least one of a state of a node's data, a geographic location, a rack position, a processing capability, and a hardware capability. According to another embodiment of the invention, the election component is further configured to evaluate database state information to establish the new node with the primary role. According to another embodiment of the invention, the system is configured to maintain strong consistency in the distributed database. According to another embodiment of the invention, the system is configured to maintain immediate consistency in the distributed database. According to another embodiment of the invention, the majority of nodes responsible for the written data include the primary node and at least two secondary nodes. According to another embodiment of the invention, the system further comprises a re-integration component configured to automatically restore a former primary node to the distributed database. According to another embodiment of the invention, the re-integration component is further configured to establish a point of consistency between the respective databases of the new primary node and the former primary node, roll back any operations on the former primary node to achieve the point of consistency, and wherein the replication component is further configured to replication asynchronously replicate any write operations performed on the new primary node executed after the point of consistency.

According to one aspect of the present invention, a system for managing asynchronous replication in a distributed database environment comprising a plurality of nodes is provided. The system comprises a role component configured to establish a role associated with each node in a plurality of nodes, wherein the role component is configured to establish a primary node with a primary role and at least one secondary node with a secondary role, an execution component configured to restrict write requests to the primary node, a replication component configured to asynchronously replicate write operations performed on the primary node to the at least one secondary node, a durability component configured to commit a write operation in response to asynchronous replication of the write operation to a threshold number of the nodes responsible for the written data.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

According to one embodiment, an automatic failover and recovery system for a distributed database includes a set of nodes hosting a plurality of databases instances. The database instances are configured to respond to client requests for information. In one embodiment, the database instances serve as an information data store for a website with which client systems interact.

In one embodiment, a database system can be configured to permit read operations from any node in response to requests from clients. For reads, scalability becomes a function of adding nodes (e.g. servers) and database instances. Within the set of nodes, at least one node is configured as a primary server. A primary server/node provides the system with a writable copy of the database. In one implementation, only a primary node is configured to permit write operations to its database in response to client requests. The primary node processes write requests against its database and replicates the operation/transaction asynchronously throughout the system to connected secondary nodes.

Figure 2:
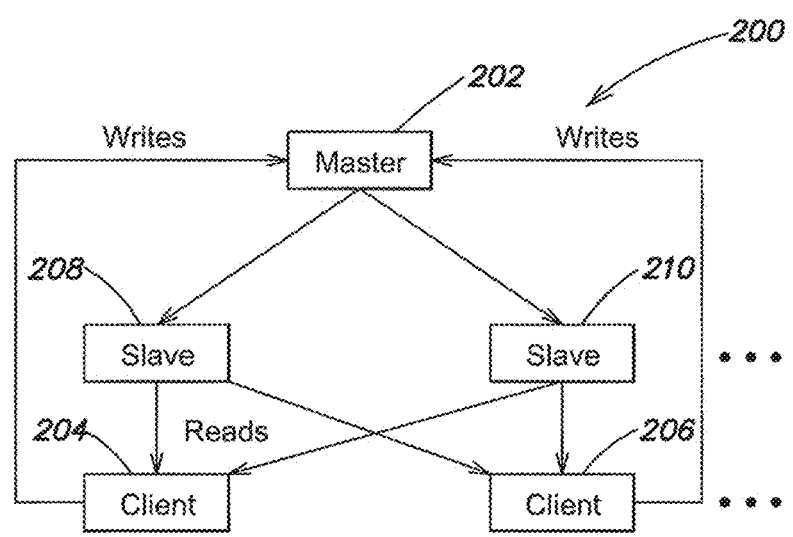
FIG. 2 illustrates a block diagram of an example replica set hosting a distributed database, according to one aspect of the present invention.

In another example, the group of nodes, primary and secondary nodes operate in conjunction to process and replicate database operations. This group of nodes can be thought of a logical unit, a replica set, for handling database operations. Shown, for example, in FIG. 2 are the basic elements of a replica set, a primary or master node 202 and secondary or slave nodes 208-210. The primary node's responsibility can transition between nodes 202, 208, and 210 within the replica set, permitting operation even in light of failures within the replica set. The secondary nodes 208-210 host replicas of the primary database and are configured to take on the primary role automatically in the event of a failure.

In another example, the primary node receives and performs client writes operations and generates an operation log. Each logged operation is replayed by the secondary nodes bringing the replicated databases into synchronization. In some embodiments, the secondary nodes query the primary node to identify operations that need to be replicated. The replica set and/or individual nodes can be configured to response to read request from clients by directing read request to slave nodes 208-210.

In one embodiment, write operations are only committed once a majority of the nodes in a replica set have performed the operation. Any committed operation is viewed as a durable write as the operation will not be lost in the event of failover operations. The write operations are also durable in the sense that node failures, communications failures and network partitions should not compromise the durable operation. Acknowledgement of replicated operations can take place based on executing a return error operation.

In one example, a client request can include a requirement that the requested operation be confirmed. In one example, a getlasterror function can return information on the requested operations, and once, for example, a majority of nodes in the replica set have executed the operation, the operation is acknowledged to a client. In some embodiments, read requests can be performed prior to true commitment of the operation across the plurality of nodes. Thus, an implementation that permits loosening of the consistency constraints can achieve improvements on read performance.

Clients, for example 204-206, from the perspective of a distributed database can include any entity requesting database services. A client can include an end-user system requesting database access and/or a connection to the database. An end-user system can request database services through an intermediary, for example an application protocol interface (API). The client can include the API and/or its associated drivers. Additionally, web based services can interact with a distributed database, and the web based services can be a client for the distributed database.

In another embodiment, write operations can be committed upon reaching a threshold number of nodes in a replica set. In one embodiment, the return error operation can be used in conjunction with asynchronous replication to insure that a predetermined threshold number of systems receive and update their respective databases based on the replicated transaction.

Any node in a set of nodes can be configured to respond to read operations from client computer systems. Both primary and secondary nodes can accept and respond to read requests. In implementations that do not require immediate or strong consistency read operations are typically handled by secondary nodes. In such a setting, consistency may not be strong, as a write operation may exist not yet replicated by the secondary nodes, further consistency may not be immediate for the same reason. According to one embodiment, reads can be restricted to the primary node providing for immediate and/or strong consistency as required.

Figure 6:
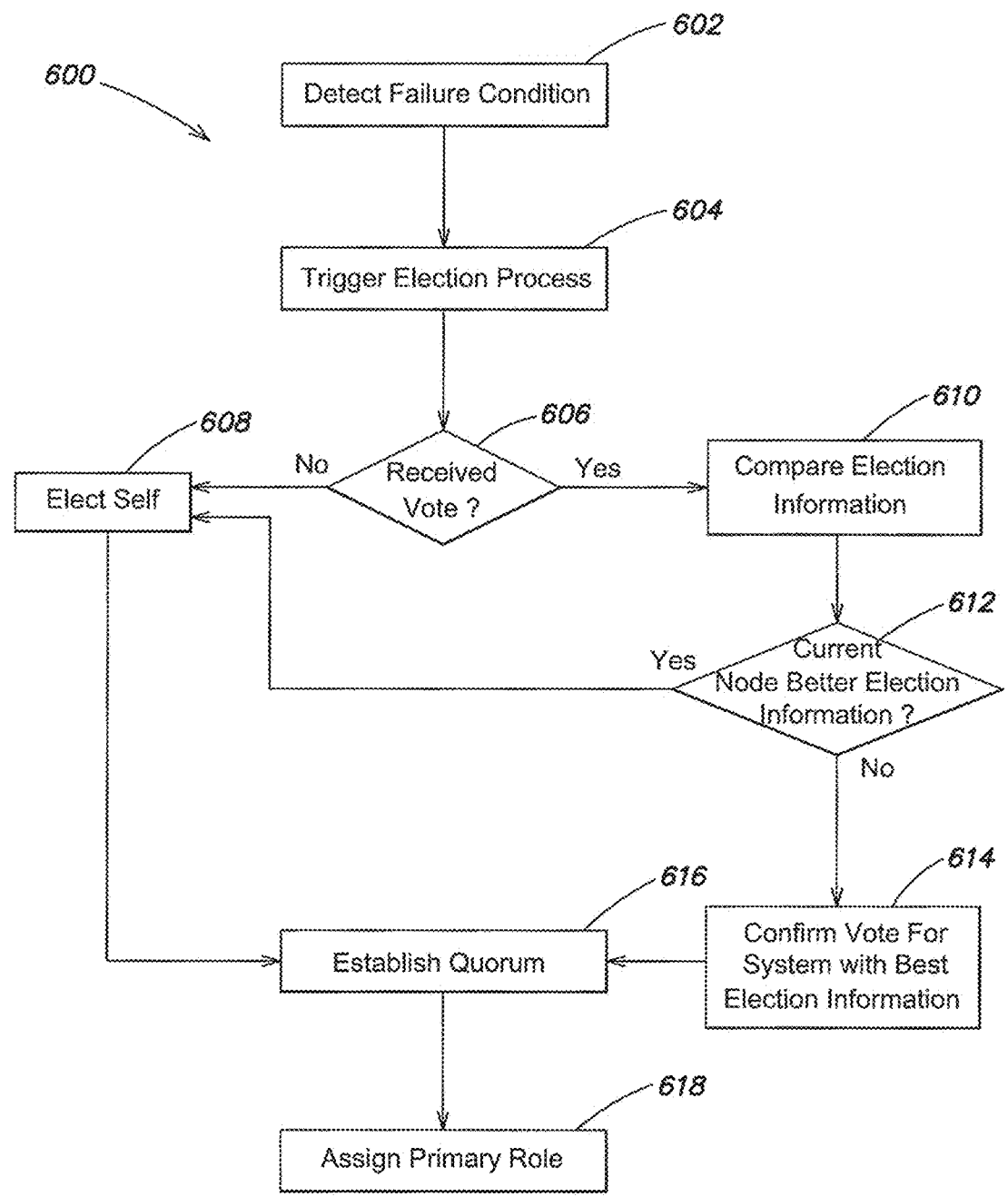
FIG. 6 illustrates an example process flow for automatically electing a primary node in response to a failure, according to one aspect of the present invention.

Typically, there are multiple secondary nodes for each primary node which make up a cluster of nodes. During initial configuration of a replica set, the nodes within a particular cluster of nodes can be identified as peers. New nodes can be added to the cluster and identified as peers. Secondary nodes are configured to identify the primary node for a given replica set. Identification can take place as part of an initial setup operation and/or can occur as part of an election protocol, wherein the nodes within a cluster automatically elect a primary node based on consensus, as discussed in greater detail below. FIG. 6 illustrates an example process for electing a primary node in response to failure, however, similar algorithms can be employed at initialization to elect a primary node.

The secondary node can be referred to as a slave to a primary node/master node. The secondary/slave node uses a unique identifier for the primary/master node from which it will receive updates. According to one embodiment, each of the nodes in the set of nodes is configured with a local database which saves status information on the node's current state, and can also include information on replication status. In a typical setting, the local database is not replicated throughout the replica set. In some examples, additional node types beyond primary and secondary can be employed within any cluster of nodes, these additional nodes types can be configured with or without such local databases.

Each node can be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

In the event that the system detects a communication failure with a master server, for example no heartbeat signal is received, an election protocol can be triggered. In another example, if a master server determines that it cannot communicate with a majority of its slaves, the master can put itself in a recovery state, which will trigger or accelerate an election protocol to identify a new master. In another example, for an individual server that cannot connect to the master or has not received a heartbeat signal from the master, that individual server can be configured to determine the state of other systems, and based on the state information perform various operation including triggering an new master election.

Figure 1:
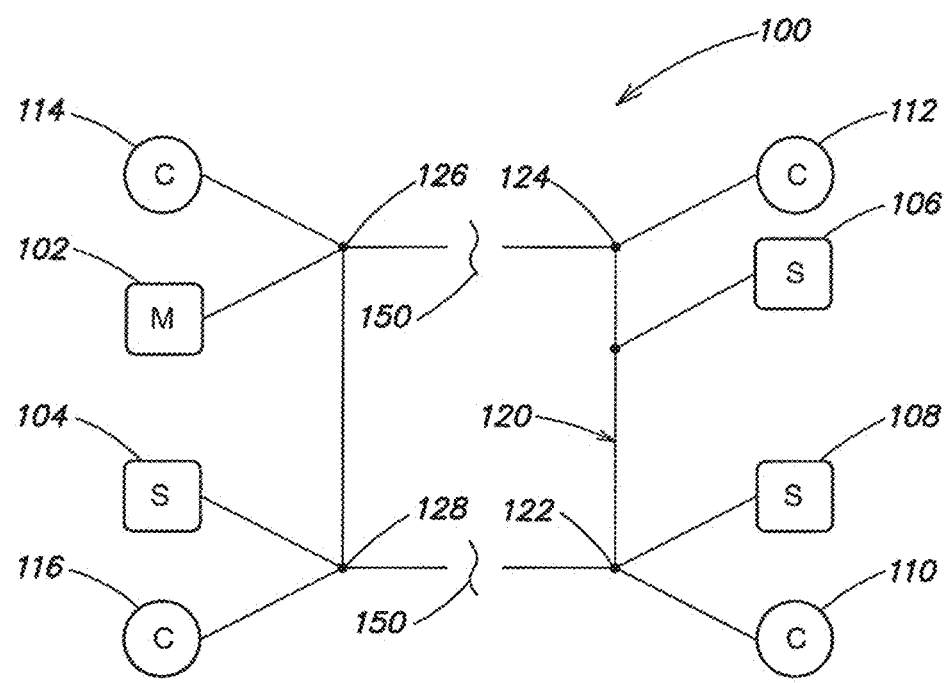
FIG. 1 illustrates a block diagram of an example distributed database system, according to one aspect of the present invention.

For example, FIG. 1 illustrates example system 100 and a communication failure at 150. System 100 comprises master node 102, slave nodes 104-108, servicing clients 110-116. Communication failure, shown at 150, can trigger failover operation to assign a new master node. Slave nodes 104-108 can assume the master node role based on election.

According to one embodiment of the election protocol, an individual server can be configured to determine if the individual server itself is the source of a communication problem or if the master server is no longer reachable, or operating properly. If the individual server remains connected to, for example, a majority of the servers in the set, then the election protocol continues with a request to establish a new master server. Alternatively, if the server determines that it cannot reach a majority of the servers in the set, the server can be configured to go into an offline state and/or recovery state. In one example, offline servers can periodically check communication status and receive updates once re-connected.

The master server can also be configured to go into a recovery state discussed in greater detail below. When attempting to re-synch, a secondary/slave node can be configured to request an operation log time to determine if its downtime exceeds the history of operations available. When the downtime exceeds the operation log time, the operation log is insufficient to resynchronize the secondary node. The secondary nodes may return to offline state, or in one embodiment, a resynchronization operation is triggered to refresh the entire database from its primary node.

In some embodiments of an election process, the request to establish a new master includes a state of the server's database that indicates how up-to-date the database for that server is. Each of the servers receiving a request to establish a new master can evaluate its own database against the other participating nodes to determine a most up-to-date server. In other embodiments, a node can be configured to query the other nodes in the set to identify the node with the "best" data. In one example, the election protocol identifies the server with the most up-to-date information and confirms a new master system once a majority of the communicating nodes agree on the new master to use for the system.

In some embodiments, additional considerations can impact the determination of a new master/primary node. In one example, the election protocol can be configured to be location aware. Slave systems can be configured to communicate location information in addition to data timeliness, and in some embodiments instead of data timeliness. For some implementations of the election protocol, various weights can be assigned to status values, so that timeliness of the data on a server is given a greater or lesser weight when evaluated against, for example, the location of the server. Location information can be configured to varying degrees of granularity. For example, geographic position can be used to determine the best system to use as a new master. In other examples, location can be expressed in terms of a position within a rack in a datacenter in lieu of or in addition to geographic position. In one implementation, a slave within the same rack as the failed master can be favored over slaves in nearby racks and/or slaves in different geographic locations.

In one example system, the election protocol establishes a consensus by evaluating votes received from participating slave systems to generate a quorum or consensus of reporting systems. In one example, a particular node can be voted for as the next master system based on a query against the other nodes in the database to determine which node has the freshest data. Once the vote identifying a particular slave system as the most up-to-date (or in another example, the server with the best location) reaches a threshold number of quorum participants, that slave system is confirmed as the new master. As a result, the elected system state is changed from slave to master and the remaining slave systems set the new master as the source for database update operations.

According to some embodiments, the election does not require complete participation of the remaining slaves, and typically only a majority of the slave systems need to respond. The system propagates the change in the master server to the remaining slaves and the remaining slaves update their configurations accordingly. The slave servers then perform the operations necessary to bring the slave in sync with the new master database. FIG. 6, described in greater detail below, illustrates one example process, 600 for electing a new master in response to detecting a failure in a replica set.

In some systems, additional server types can be employed in addition to the servers established as masters and slaves (i.e. primary and second nodes). In one example, server systems can be configured with more than one role, functioning as both slave and as an arbiter. A node assigned an arbiter role can be configured to facilitate the election protocol and improve efficiency during election of a new master. Arbiter systems can be configured with "voting" rights in the election protocol, but typically, are not permitted to take on the master server role. In some settings, the arbiter system receives information on slave system status and facilitates reaching consensus by accumulating the status information and communicating information associated with the most suitable candidates. Arbiter system can also positioned advantageously with respect to other nodes in a cluster of nodes. For example, arbiter nodes can establish a different communication point of view of the nodes in a particular cluster and indentify nodes most suitable to take on the primary node responsibility. In another example, an arbiter node can be located outside a particular datacenter to permit different views of a network's communication status. According to one embodiment, because the arbiter node can be configured with no data, any latency introduced by its location does not affect overall performance of a replication system, or any particular replica set.

Different election protocols can use arbiters in different capacities, as a conflict resolver where conflicts occur, as a replicator to transmit agreed upon information, and the arbiter can also participate in any grouping of agreeing systems, typically referred to as a quorum. Different consensus protocols have different processes to ensure a proper consensus is reached. In some protocols, certain nodes in a cluster may be given the authority to vote more than once. According to one example, a node can be given multiple votes in the consensus protocol to facilitate election. For example, multiple votes can insure a tie does not result. In one embodiment, a voting system becomes part of a quorum when its vote matches that submitted by another system. Each subsequent system that agrees with the vote becomes another member of the quorum. The quorum systems can be used to confirm votes, improving the consistency of the consensus determination.

Figure 8:
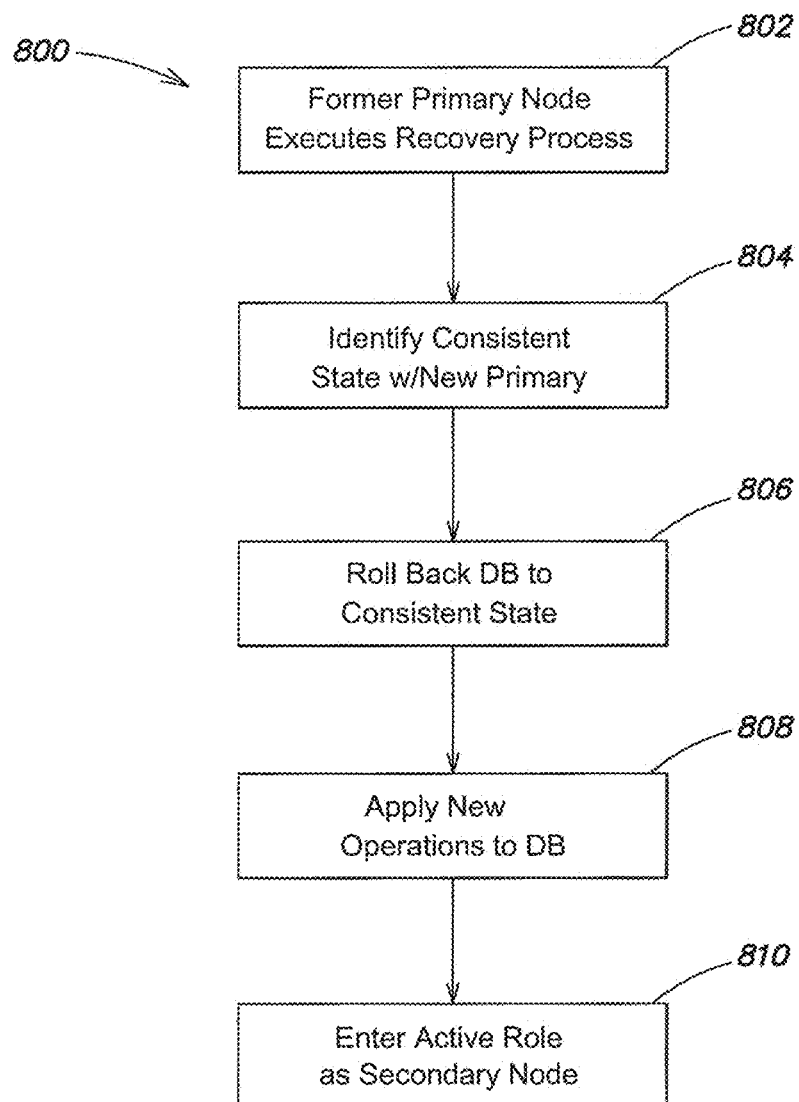
FIG. 8 illustrates an example process for automatic recovery of a former primary node into a replica set, according to one aspect of the present invention.

In additional to automatically establishing a new master server, a replication system can be further configured to re-integrate the former master server. In response to the former master reestablishing connection to the new master server, the former master server will perform reintegration operations automatically. For example, FIG. 8 illustrates an example process for re-integration of a failed master node into a replica set. In some embodiments, the former master detects that it cannot communicate with a majority of the servers in the set of servers. Upon detecting the failed communication, the former master can be configured to place itself in a recovery mode. This will prompt the slaves that could communicate with the former master to participate in the election of a new master. The former master can be configured to monitor its communication status and upon detecting a good connection, trigger reconciliation. The former master is configured to retrace the state of its database via its operation log and can identify the most current point that exists in the former master's database that is consistent with database on the new master server. In one setting, this represents the last durable operation replicated to the replica set.

In another example, a former master can be configured to query the new master to obtain a time associated with the new master's operation log and to identify the operations that need to be performed. The former master rolls back the operations performed on its copy of the database to reach a consistent state. In some embodiments, the consistent state represents the state of the database corresponding to committed transactions replicated from the former master. In one embodiment, the former master can be configured to perform roll back operations based on the operation log that it maintained to reach a point of consistency. In another embodiment, the former master maintains an undo log for the changes in the database. Once the former master has reached the point of consistency with the new master server—consistent with the new master's old state, the former master can execute the operations maintained by the new master server to bring it to the new master's current state. The former master executes the operations received from the new master and the former master becomes consistent with the current state of the datastore. Once the former master is consistent, the former master can be configured to change from recovery mode and become an active slave system that can, for example, respond to any read request.

Example Resolution of Primary Failover

In one embodiment of the automatic failover system the following behavior can be observed in response to a hypothetical replication and write request scenario. The system is configured with a set of three nodes A, B, and C. Each node is configured with an operation log (reflected below by "oplog( )") where each operation on a respective database is written. The primary node receives and executes any write operation first. Secondary nodes query the primary's operation log to retrieve operations to replicate on their respective database. Typically, the primary node is configured to assign a monotonically increasing value to each operation. In some embodiments, a primary node identifier is also included (e.g., a1, a2, . . . c4, . . . ) with the increasing value.

The following statements report on server status and identify write operations to be performed on the respective nodes:

. . . initial state—no operations
  server-a: secondary oplog: ( )
  server-b: secondary oplog: ( )
  server-c: secondary oplog: ( )
  . . . receive write operations at primary (server-a) a1, a2, a3, a4, a5 . . .
  server-a: primary oplog: (a1,a2,a3,a4,a5)
  server-b: secondary oplog: ( )
  server-c: secondary oplog: ( )
  . . . asynchronous replication . . .
  server-a: primary oplog: (a1,a2,a3,a4,a5)
  server-b: secondary oplog: (a1)
  server-c: secondary oplog: (a1,a2,a3)
  . . . communication failure//server-a goes down . . .
  server-b: secondary oplog: (a1)

server-c: secondary oplog: (a1,a2,a3)
. . . initiate election process: server-c higher priority than b: alternatively c and b priority equal but maxoptime for c greater than b
server-b: secondary oplog: (a1)
server-c: primary oplog: (a1,a2,a3)//c has highest ordinal value and is elected primary
. . . continue replication from c to a; receive write request c4 . . .
server-b: secondary oplog: (a1,a2,a3)
server-c: primary oplog: (a1,a2,a3,c4)
. . . server-a resumes: former primary server-a enters recovery . . .
server-a: recovering oplog: (a1,a2,a3,a4,a5)
server-b: secondary oplog: (a1,a2,a3)
server-c: primary oplog: (a1,a2,a3,c4)
. . . server-a re-synchronizes with c and applies any pending operations b replication continues . . .
server-a: recovering oplog: (a1,a2,a3,c4)
server-b: secondary oplog: (a1,a2,a3,c4)
server-c: primary oplog: (a1,a2,a3,c4)
. . . primary receives write requests c5, c6, c7, c8 . . .
server-a: secondary oplog: (a1,a2,a3,c4)
server-b: secondary oplog: (a1,a2,a3,c4)
server-c: primary oplog: (a1,a2,a3,c4,c5,c6,c7,c8)
. . . replication to a and b . . .
server-a: secondary oplog: (a1,a2,a3,c4,c5,c6,c7,c8)
server-b: secondary oplog: (a1,a2,a3,c4,c5,c6,c7,c8)
server-c: primary oplog: (a1,a2,a3,c4,c5,c6,c7,c8)
. . . eventual consistency reached for system and nodes . . .

As illustrated in the above example, server-c is automatically elected primary after server-a fails. Operations (a4,a5) are lost/discarded during the election of the new primary (server-c) and subsequent recovery operations performed on server-a. Operations c4, c5, c6, c7, and c8 represent new writes operations handled by the new primary server-c. According to the illustration, each operation is assigned a new ordinal value that follows server-c's latest state=a3, and each operation is assigned a subsequent ordinal and the primary server identifier for server c: c4; c5; c6; c7; and c8.

According to one embodiment, a maxoptime function returns the current state of a respective node's database. Maxoptime(0) is an initial state—for each of the nodes, the system is clean with no updates. In some settings, the nodes in a replica set can be configured to obtain a full copy of a primary node's database as an initialization process. As can be observed in the example above, in response to a replication failure within a replica set, an election process is automatically initiated to establish a new primary system. The replication failure can be the result of failed communication from the primary node to a secondary node. For example, a primary node can detect that it cannot communicate with a majority of the nodes in the replica set, and automatically put itself in a recovery state. The nodes still communicating with the primary will now participate in an election process. Likewise, nodes that cannot communicate with the primary can also trigger an election process.

Once a new primary node is elected, the new primary and the remaining nodes in the replica set must reconcile their database states. Consistency is preserved during the reconciliation process by identifying a point of consistency in the new primary's database, reversing any transaction necessary to achieve the point of consistency, and then processing any new incoming transaction from that point forward. In essence, any operations that have not replicated to a majority of the nodes in the replica set are lost during a failover scenario. Secondary nodes in the replica set can be configured to determine if they can achieve the point of consistency with the new primary node and reconcile accordingly. According to one embodiment, permitting discard of uncommitted operations reduces complexity in preserving consistency, providing automatic failover, and/or providing for re-integration of failed primary nodes.

Figure 4:
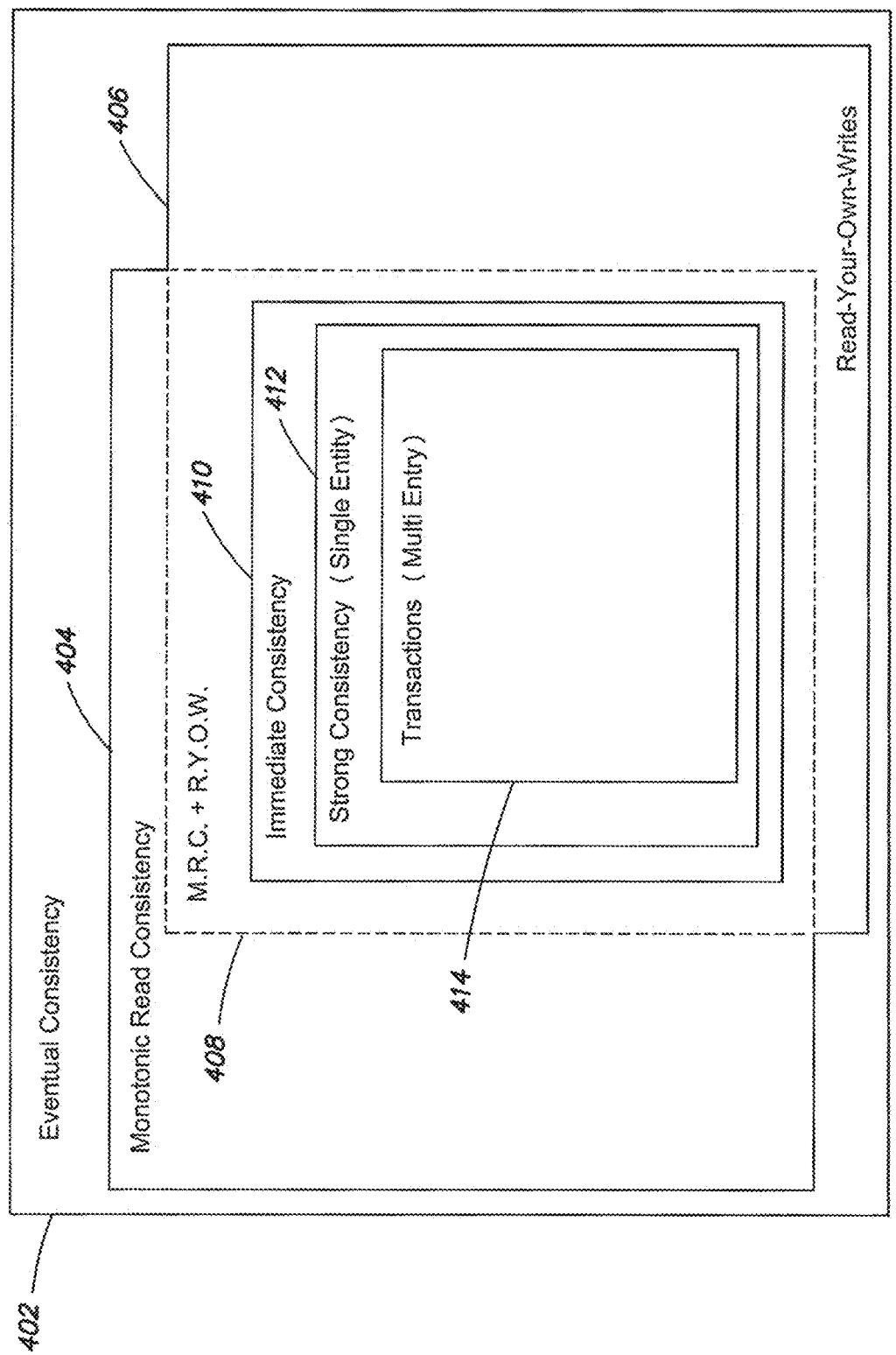
FIG. 4 is block diagram of an example relationship diagram of some consistency models, according to one aspect of the present invention.
Figure 5:
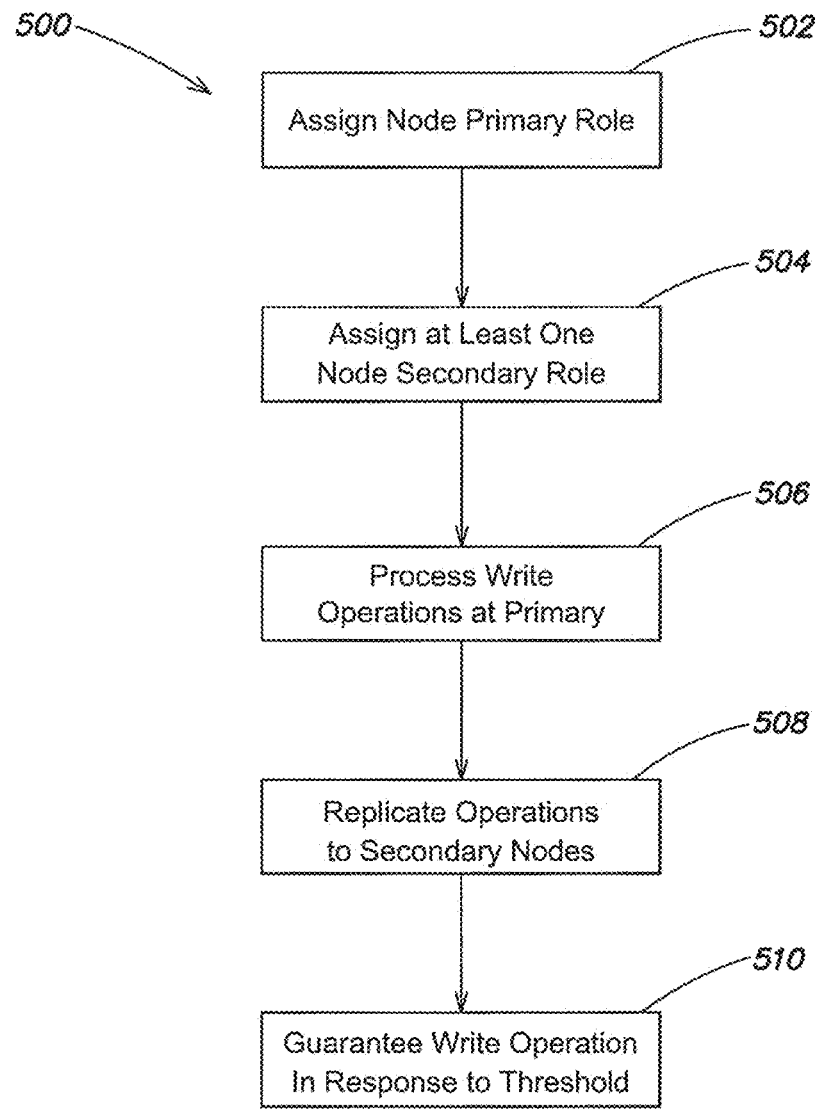
FIG. 5 illustrates an example process flow for asynchronous replication of operations in a distributed database system, according to one aspect of the present invention.

According to one aspect, provided are systems and methods for automatic failover of a distributed database system that maintains strong consistency for a distributed database. One strongly consistent model is shown in FIG. 4, which illustrates the relationship between some database consistency models. In an example setting, a plurality of nodes (e.g. servers) hosting database instances are configured to respond to read and write request made by client systems. Typically the nodes are assigned various roles to facilitate consistency and automatic failover operations. There are two major roles within a replica set hosting a database. A node with a primary role processes write requests and replicates the write requests as transactions to secondary nodes. In one embodiment, replication occurs in response to queries by the secondary nodes against the primary node. A node with a secondary role can be configured to respond to read requests and to process transactions from a primary node (node with the primary role). Other roles can be implemented, including arbiter roles. Arbiter nodes are configured to participate in quorums, for example, as part of an election process. An election process can be invoked in failover scenarios, to automatically select a new primary node in response to communication failures, primary node failures, etc. Typically, an arbiter node does not participate in handling of read or write requests. In one example, an arbiter node does not host any data contained in the replicated database.

Various modifications can be incorporated into the roles. For example, a node can be given a secondary role, with the restriction that it can never become a primary node. In effect, a never primary node, is removed from consideration in the event of a primary node failure. The never primary secondary node can, however, participate in an election process to establish a quorum identification of a new primary node. Other roles can be assigned and can include a back-up role. According to one embodiment, a node having a back-up role does not create indexes for a database it hosts. In essence the back-up node has a full back up of the data but is designated for back up purposes and does not provide its database copy for reading, failover election of primary operations, and/or re-integration of failed primary nodes. In another embodiment, additional roles can be provided, and can include secondary nodes configured to have different indexes than other members in the replica set (e.g. other secondary nodes or even the primary node).

According to one embodiment, a plurality of nodes can be organized in groups of nodes in which data is stored and replicated across the nodes of the set. Each group can be configured as a replica set. In another embodiment, one or more nodes are established as primary nodes that host a writable copy of the database. Each primary/master node can be responsible for a portion of the database, e.g. a database shard. Database sharding breaks up sections of the database into smaller portions based on, for example, ranges of the data. In some implementations, database sharding facilitates scaling a master-slave architecture over a large number of nodes and/or large database implementations. In one embodiment, each database shard has one primary node which replicates its data to its secondary nodes. Database shards can employ location preferences. For example, in a database that includes user records, the majority of accesses can come from specific locations. Migrating a shard primary node to be proximate to those requests can improve efficiency and response time. For example, if a shard for user profile includes address information, shards can be based on ranges within the user profiles, including address information. If the nodes hosting the shard and/or the shard primary node are located proximate to those addresses, improved efficiency can result, as one may observe the majority of requests for that information to come from locations proximate to the addresses within the shard.

In one example, a master node updates its database in response to client write requests, and replicates changes to the database throughout the set of nodes asynchronously. Multiple replica sets, each with their own master node, can be employed. Traditional database systems employ master and slave nodes, however, these conventional systems fail to properly address the need for new master nodes in response to failures. Conventional systems may also fail to provide automatic assumption of master node responsibilities. Automatic assumption of primary/master node responsibility is particularly beneficial when, for example, the plurality of nodes making up a replica set are distributed across vast distances and include a large numbers of nodes. In these settings, communication failures present significant issues for availability and consistency of data within a distributed database. Under some conventional approaches, any failure of a master node can result in significant downtime and worse can require refreshing entire databases of master and/or slave nodes during restoration and/or reconciliation.

According to one embodiment, restricting write operations to a primary node simplifies database architectures that favor consistency. However, establishing primary nodes to service write operations requires that primary node failures be resolved quickly, efficiently, while preserving data consistency. Eventually consistent database architectures (asynchronous replication) are potentially vulnerable to primary node failure because of the replication methodology. As discussed above, some conventional systems solve this problem by having multiple nodes that permit write operations (for example multiple master nodes) which host and replicate data. The additional complexity in having multiple nodes with writable database instances is disadvantageous in many settings. Additionally, having multiple writable nodes for the same data may introduce inconsistency that requires complex resolution logic to reconcile conflicting transactions.

According to one embodiment, implementing a primary node that replicates transactions throughout a replica set provides for consistency in a database copy on each node of the replica set using asynchronous replication. Replica sets can be used, for example, in conjunction with web sites that require consistency, and further web sites that can tolerate some loss of data to insure consistency. Because of the nature of the replication process, data may be lost due to a replication failure, and the system can maintain consistency in light of such failures by guaranteeing committed transactions. Other conventional systems focus on the availability of data over consistency and provide costly operations that must resolve inconsistent versions of database images read by client systems. By loosening constraints on availability, for example, better performance can be achieved. In another example, strong consistency can be achieved for systems that can tolerate loss of uncommitted operations.

According to another embodiment, replica sets are configured for automatic failover of primary node responsibilities, while at the same time the replica set is configured to preserve consistency of the database image throughout the replica set. According to one embodiment, strong consistency is achieved in an asynchronous setting through committing write operations that replicate to a majority of the nodes within the replica set and discarding operations that do not replicate to the majority of nodes in a failover scenario. In some embodiments, additional performance increases are achieved in the replica set by permitting reads operations to occur against operations that are not fully committed throughout the replica set.

FIG. 1 illustrates an example implementation of a distributed database system, with primary 102 and secondary nodes 104-108 servicing database requests received from client computer systems 110-116. Client computer systems 110-116 communicate request to the distributed database system over a communication network 120. The client computer systems 110-116 are connected to the communication network through for example router/switches 122-128. In some embodiments, other client computer systems can be configured to communicate requests to the distributed database system. The other client computer systems can be connected to the communication network 120 through communication networks, for example an intranet or private network (not shown). Illustrated at 150 is the effect of a partition event on the communication network 120. The result of the partition event is that slaves 106 and 108 are unavailable to the distributed database system. Slave systems 106 and 108 can be configured to continue processing requests from the client systems 110 and 112 that can reach them. As slave systems are configured to respond only to read requests, the access to such client systems would be restricted to read operations. The effect of a partition event on an example system 100 is discussed in greater detail below. Typically, an election process is triggered in response to loss of communication with the primary node 102. In one embodiment, primary 102 can detect communication failure to a majority of nodes and transition to a recovery state. In recovery state, original primary node 102 can become a secondary a node, and another node in the set of nodes can take on the primary node responsibility.

Shown in FIG. 2, is an example of a replica set, 200, hosting a distributed database 200. Master/primary node 202 accepts write requests from client systems 204-206. Slave/secondary nodes 208-210 accept reads requests from client systems 204-206. The three dots next to slaves 208-210 represent a system component that can be scaled out by adding additional systems. That is multiple additional slave systems can be installed and configured to replicate the database hosted on master system 202. Further, additional slaves systems can be installed and configured to provide responses to client read requests. Additional clients systems can request information and perform write operations on system 200 as also shown by three dots next to clients systems 204-206. In one example implementation, clients systems 204-206 can be permitted to randomly read from slaves 208-210. Other implementations can be configured to provide different levels of consistency, by restricting read requests. For example, read requests can be restricted to systems having up to date data, read requests can also in some settings be restricted to primary systems, among other options.

System 200 can be configured to perform according to a single writer eventually consistent model. The single writer eventually consistent model provides for a loose form of consistency. In one particular example, (assuming >3 slave systems) client systems (e.g. 204-206) request write operations: W(x=3); W(x=7); W(x=5). As the replication of the write requests occurs asynchronously, at some point all of the slave systems (e.g. 208-210) will respond to a read request with 5. However, in the short term (during replication operations) client systems randomly reading from slaves can see [read operations designated by R (variable and actual value)]: R(x==7); R(x==0); R(x==5); and R(x==3). In such a configuration system 200 provides eventual consistency and can permit out of order reads (in the short term). Other example implementations can increase the strength of consistency, and for example, can include monotonic read consistency (no out of order reads).

Figure 3:
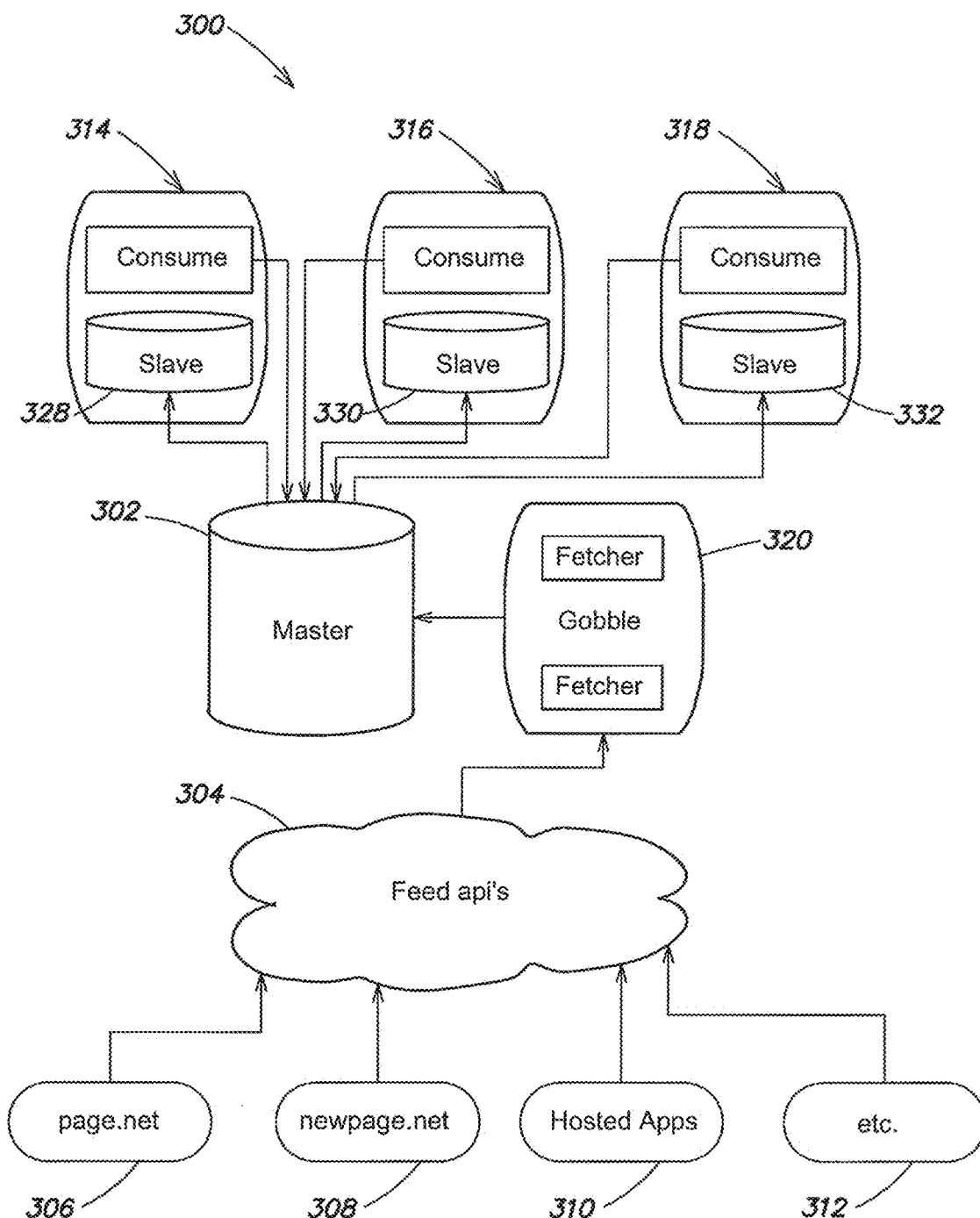
FIG. 3 illustrates an example system architecture for providing a distributed database with automatic failover capability, according to one aspect of the present invention.

Shown in FIG. 3 is an example system 300 that can be configured to provide monotonic read consistency. Master 302 responds to client write operations through various APIs (application protocol interfaces) 304. Various services and/or web based applications can be configured to transmit read and write requests through various APIs 304. For example, multiple webs pages 306 and 308 can be configured to accept and transmit requests from end users for database services, hosted applications 310 can also require that read and write operations be performed on a distributed database in addition to other services 312 that can be configured to process database requests through APIs 304 (for example rss feeds, ecommerce transaction requests, query operations, browsing operations, in other words any service which can invoke a database for storing and/or retrieving data). APIs 304 trigger a fetcher process 320 that coordinates write and read operations against the distributed database, master 304 and slaves 308-312. Replication is asynchronous from master 302 to slaves 328-332 and can be configured to provide for eventual consistency. The fetcher processes 320 can be configured to insure that no out of order reads are returned in response to client requests. Processes 314-318 are invoked by the slaves 328-332 to retrieve the operations on the master 302 that need to be executed. Processes 314-318 are executed periodically to keep the slave systems 328-332 in sync with the database on the master close or in real time.

Shown in FIG. 4 is an example relationship diagram of some consistency models. As shown, eventual consistent model 402 guarantees that if no new updates are made to an object, eventually all accesses will return the last updated value. This eventually consistent model permits out of order reads. Bounded within the broad eventual consistency model are 404 monotonic read consistency, eventual consistency with no out of order reads, and 406 read your own writes consistency models, where a client that requests a write operation is guaranteed to subsequently read that written operation. Read your own writes can result in out of order reads as illustrated by the portion of 406 outside the 404 portion of the diagram. The combination of 404 and 406 yields monotonic read consistency (MRC) and read your own writes (RYOW) at 408. An example system displaying MRC+RYOW properties would include a master-master replication system, where a given client always interacts with a single master. A stronger consistency property would include 410 an immediate consistency model, which provides for immediate consistency where readers and writers to a database always see the most up to date value for a record or document. At 412, shown is a strong consistency model for single entities, which includes a system that supports read and write atomic operations on single data entities. Last, at 414 shown is a full transaction based consistency model where multiple entities provide for consistency by using transaction protocols, and would include the ORACLE model. In the full transaction consistency model 414, as implemented by ORACLE both data consistency and availability are achievable, however, such a model cannot tolerate network partitions. In distributed database systems network partitions are a certainty, thus the transaction consistency model is inappropriate for distributed databases with even a possibility of communication failure.

Thus, it is recognized that solutions are needed that automatically preserve write access to database implementations in the presence of network partitions and other failure events, and further systems are needed that provide for assumption of a primary node's responsibilities within a replica set. Additionally, assurance of strong consistency within a replica set can also be provided based on the configuration of the replica set even during and after failover operations. Strong consistency can even be maintained using an eventual consistency framework, where replication operations are propagated from a primary system to secondary system asynchronously.

According to one embodiment, a system implementing one or more replica sets can be configured to provide for immediate consistency. In one example of an immediately consistent model, each reader and writer (e.g. client systems) to the database always sees the latest updated values within the database. In one embodiment, the operations performed on the database are atomic, i.e. an operation is successful or not. Thus any successful write on the database is immediately seen by subsequent read requests. In another embodiment, immediate consistency is achieved by limiting read operations to primary nodes. In some other embodiments, the system limits read requests to a primary node in response to having performed a write operation. Some example systems limit reads requests to the primary node for a period of time after processing a write operation. Once the period of time expires any node, primary or secondary, can respond to read requests. In some settings, the time period can be set to insure that a write operation has time to replicate throughout the replica set. Various timing parameters can be used, and the system can be configured with timing parameters to limit read requests to a primary node until the specified time elapses. In one example, the system can be monitored to determine a typical and/or average time for replication and a timing parameter can be set accordingly.

In another embodiment, a system implementing one or more replica sets can be configured to provide strong consistency, where at any given point of time there is no question of the latest version of a record and/or document found on a primary node. Some embodiments incorporate monotonically increasing values with operations on the database, thus the system can be configured to guarantee consistent versions of a record/document will be accessed in response to read/write requests on the database. The system can also insure that replication of operations occurs consistently. In some examples, secondary nodes monitor received operations based on the monotonically increasing value and reference the value for its last update. Thus any potential inconsistency can be detected and corrected by the system with a new query to a primary node to retrieve the operation with the appropriate value.

Process 500, illustrates an example of a process for asynchronous replication of operations in a distributed database system. Given a set of nodes on which a database is implemented, process 500 begins with assigning primary and secondary roles to nodes in a replica set. Assignment of a primary node can occur as part of an initialization at start up. In one alternative, assignment can occur based on the set of nodes that make up a replica set electing the primary at startup. Initialization can also include full replication of a database from one node to other node in the set. For example, a node may be added or initialized into a set using a synchronization operation that causes the node to capture a complete copy of a database as it exists on another node. Once synchronization is complete, replication operations can proceed for that node.

In some implementations, a single primary node provides a writable copy of a database, where write operations performed on the primary node are replicated asynchronously to all of the primary's secondary nodes. The primary node replicates operations, for example, writes, by generating an operation log that reflects the operations performed on the primary/master database. The operations are then transmitted asynchronously from the primary node to its respective secondary nodes. In some settings, the secondary nodes are configured to periodically query the operation log of the primary node to determine any operations that should be retrieved and executed. According to one embodiment, the operation log is configured to be part of the database itself. In another embodiment, the operation log is configured to not exceed a maximum size.

As operations occur they are logged until the maximum log size is obtained, at which time the oldest operations are discarded in favor of the newer operations. The transaction log thus reflects a window of time for operations that can be replicated based on the permitted size of the operation log. The larger the size of the operation log, the greater the tolerance for downtime of nodes in the replica set. In one example, an operation log can be configured to a maximum size of 5-10% of the node's hard drive space. Other sizing for the operation log can be employed.

Each operation in the log can be associated with a time and an increasing value so that an order can be determined for each operation. In one example, a monotonically increasing value is employed and associated with each operation. Each operation can also be time stamped. In one embodiment, the time stamp reflects the time of the primary node. Based on analysis of a first and last operation, a maximum operation log time can be determined. The maximum operation log time can be used in conjunction with replication operations to identify systems too far out of synchronization to replay operations from the log and thus require refreshing of the entire database. In some embodiments, the operation log can be implemented as part of the collection of data and is thus replicated throughout the replica set. In some embodiments, each node can be also configured with a local database which is not replicated.

The local database can be configured to maintain information on local state. For example, a secondary node can maintain information on its lag time (any delay between synchronization with primary), time of last applied operation, address of primary node, as examples. Specific node configurations can also be configured in the node's local database. In one embodiment, a secondary node executes a query against a primary node to determine all operations on the primary with a time stamp equal or greater than the last applied operation time stamp in its local database. In another embodiment, the secondary node can query the primary node to determine all operations on the primary with an operation value (the increasing value) greater than or equal to the operation value last executed on the secondary.

In another embodiment, the secondary node can identify based on the first operation retrieved whether there are any missing operations. In the event of missing operations, a secondary node can be configured to halt replication and enter an offline state. Once in the offline state, a node may require intervention to restore function. In some examples, a node can be automatically returned from halted replication by refreshing the entire database for the node.

The transaction log of the operations performed on the primary node can reflect optimizations and/or transformations of the operations performed at the primary node. For example, increment operations performed on the master database can be transformed into set operations. In some examples, operations performed on the primary can be merged prior to generating an entry on the transaction log reducing the overall number of operations replicated to the secondary nodes.

According to one embodiment, the primary node also maintains an undo log that facilitates reversal of transactions performed on its database. Uncommitted transactions, for example, may need to be rolled back during failover situations. Replication from a primary to secondary nodes can include a commitment operation. In one embodiment, a distributed database can be hosted across multiple primary nodes with each primary node hosting a shard of the database. A database shard forms a distinct portion of the database. Each shard can be configured based on ranges of values, for example, with the entirety of the value ranges being represented across the primary nodes of the database.

In one embodiment, at 502 a node is assigned a primary role, making the node the primary node. Additional nodes can be assigned a secondary role at 504. Each secondary node hosts a replica of the database on the primary node. From a client perspective, the databases hosted on the secondary nodes are read only. The secondary node databases are only updated in response to operations received from the primary node.

In some implementations, in addition to hosting read only replicas of the primary database the secondary nodes are configured to assist in the operation of the replica set. In particular, the secondary nodes participate in protocols to elect a new primary node in the event of failures within the replica set. Such protocols can be based on establishing a new primary node based on a quorum of participating nodes. Such a quorum protocol can be configured to require majority participation, for example, or can be configured require a threshold number of participants prior to completing any quorum protocol. A secondary node is configured to respond read requests with its most up-to-date data. In some settings, the secondary node can be configured to respond to read requests with not fully committed data to provide the most up-to-date response. In one embodiment, read requests can be blocked for particular nodes or particular documents within a database until any write operations affecting the data have been committed.

Secondary nodes, as well as the primary, can monitor communication status with other nodes to determine if a failure has occurred. Communication failures can be readily detected by monitoring, for example, heartbeat signals from other nodes in a replica set. In some embodiments, the primary node can detect failure and place itself in a recovery state, triggering election processes by secondary nodes. Secondary nodes participate in voting processes, discussed in greater detail below.

Once a primary node and at least one secondary node have been established, steps 502 and 504, the basic elements of a replica set are configured. According to one embodiment, a replica set is initially configured with a primary node and at least one secondary node. In addition to primary and secondary nodes, other node types can be employed in a replica set. Additional nodes types can include a passive node, which can include any function performed by a secondary node, with the exception of being elected as a primary node. For example, a passive node can participate in voting for a new primary but will never take on the primary node role.

Arbiter nodes can be established within a replica set. In some embodiments, arbiters are configured to facilitate the quorum/election protocols. For example, Arbiters can improve efficiency during election of a new primary node. Arbiter systems can be configured with "voting" rights in the election protocol, but typically, are not configured to take on the primary node role. In some settings, the arbiter system receives information on secondary system status and facilitates reaching consensus by accumulating and communication the status information for election protocols. Other example nodes can include back-up nodes used to maintain non-indexed copies of the database. Further, a replica set can also be configured to permit nodes with different indexes for their respective database instances.

At 506, a replica set is configured to respond to a client write request by processing the write operation on the primary node. In some settings, a client requests database access through application protocol interfaces (APIs). An API can be configured to execute a driver that can identify a primary node in a replica set. In one example, a driver program is configured to connect to the entire replica set and identify any primary. The API, and/or an associated driver, can be configured to retain information on any identified primary node. In the event of primary node failure an error can be returned when a request asks a non-primary node to perform primary only operations, e.g. write. In response to such an error, the API and/or any associated driver can be configured to re-indentify a new primary node.

The primary node generates an operation log for each database operation, and the operation is replicated asynchronously to the secondary nodes at 508 by having the secondary nodes execute the operation from the primary node's operation log. According to one embodiment, the secondary nodes also record operation records to a secondary local operation log to track applied operations. During generation of the operation log on the primary node, each operation can be assigned a monotonically increasing value. Further, each operation can also be associated with information on the primary node. For example, an identifier for the primary node can be assigned, and/or a time stamp can be assigned based on the primary node time. A maximum operation time can reflect the monotonically increasing value and thus can be used to identify how up-to-date a secondary node's database is. Various functions can request a maximum operation time from a node to determine the respective state of the node's database.

Each secondary node can be configured to participate in an election protocol that establishes by quorum comprising a threshold number of nodes that a particular node should be the new primary node. For example, the secondary node can be configured to join and/or announce membership in a group of secondary nodes that have also identified a particular node as the next primary node. Once the number of members in the group/quorum reaches a threshold number, the elected node can be assigned a primary role. In one example, an arbiter system can collect status information on quorum participants. The arbiter system can be further configured to communicate the quorum result and/or trigger the status change to primary. In some embodiments, the quorum protocol is configured to require that a majority of the nodes responsible for the written data participate in the quorum prior to sending an acknowledgement.

One example election process includes querying all others nodes for their maxappliedoptime. For a node that determines it has the greatest maxappliedoptime (freshest data set), that node will attempt to elect itself. The self elect operation can be restricted to nodes that can communicate with a majority of nodes in the replica set. Upon receipt of a vote message, a given node will determine if its data is fresher and if not, confirm the received vote, and if yes, respond to the vote message with a negative vote. The example process can be augmented, by including timeouts for sending vote messages. For example, after confirming a vote or electing self, a node can be configured to respond negatively to all other vote messages for a period of time. In addition, the above process can be repeated until a node is elected. In some examples, tie resolution can include a random wait period and a new check for freshest data/maxapplied optime.

In some settings, a primary node can be configured to block write requests when secondary nodes are too far behind. In one example, a maximum lag value can be configured for a replica set that triggers a primary node to block write requests when exceeded. In one embodiment, the maximum lag time can be expressed at a maximum lag time for a threshold number of nodes. If the number of number nodes with a lag time exceeds the threshold, the primary node blocks write operations. In one implementation, lag time for a particular node can be reported periodically. In another implementation, queries can be executed against nodes in the replica set to determine lag time. In some settings, secondary nodes can request that a primary node block write operations in response to lag time. Lag time can also be calculated and/or reported on by, for example, arbiter nodes based on queried maximum operation time. Additionally, arbiter nodes can report on status messages from secondary nodes that reflect maximum operation time for the given node. In some embodiment, secondary nodes are configured to provide reporting on status, and in some examples, can be configured to track status information on other nodes in a replica set.

At 510, once an operation has been replicated at a threshold number of nodes, the operations can be guaranteed to be retained by the replica set. For example, where the threshold number of nodes represents a majority of the nodes in the replica set, even in light of a failed primary, the operation that has reached the majority of nodes will be retained. Although automatic fail-over processing can result in lost data, an operation becomes durable once replicated across a majority of the nodes within the replica set. In one example, during a failover scenario an operation having reached a majority of nodes will be present on any node subsequently elected primary, preserving the operation. According to one embodiment, transactions that have not replicated to a majority of nodes in the replica set can be discarded during failover scenarios. For example, election of a new primary identifies a secondary node with the freshest data, and re-integration of the failed primary will result in loss of any data not present on the new primary.

In some embodiments, nodes can be prevented from taking on role of a primary to prevent data loss. In particular, transient failures of communication and even failure of an entire datacenter's power can occur in routine operation. By configuring each node with a local uptime counter, a node can check its uptime to determine eligibility for primary status. Requiring eligibility checks, for example based on uptime, can prevent data loss in the event of transient failures and even where a datacenter looses power. As the nodes in a replica are restored, depending on the order in which the nodes return to operation a secondary node could trigger a failover process. Failover procedures can result in the loss of data that has not replicated to a majority of nodes. Limiting a primary election process to eligible nodes can minimize resulting data loss.

Example process 600, FIG. 6, illustrates an example failure and primary node election process. Process 600 begins at 602 with the detection of a failure event. Failure events can be based on communication failures. For example, each node in a replica set can be configured to provide a heartbeat communication message, the absence of the heartbeat message permits identification of communication failures. Other examples include secondary nodes that receive error messages when attempting to query their primary nodes. Further, power failures and/or hardware failures on nodes can result in a failure event that triggers an election protocol at 604. The first node to participate in the election process will not have received any vote messages from any other nodes 606 NO and will seek to elect itself at 608. For other nodes participating in the election, the node may 606 YES or may not 606 NO have received a message from other nodes requesting that the node confirm a received vote. If a vote is received 606 YES, a node compares the election information of the received vote against its own values at 610. If the node has greater election values, for example, a higher priority, fresher data, better location, size of hardware, etc, the node attempts to elect itself at 608. The systems that attempt to elect themselves will become part of a quorum of systems at 616 representing the identification of node that can take on the primary node role. Nodes will enter the quorum either by electing itself at 608 or by confirming a vote for another node at 614. If for example at 612 NO, it is determined that a node receiving a vote does not have election information greater than the received vote, then the receiving node confirms the vote for the node with the best election information at 614. If the receiving node has better election information 612 YES, the receiving node can vote for itself at 608. Once the quorum reaches a threshold value for the number of participating systems, the node identified for primary by the majority of participating nodes is assigned the primary node role at 618. In one embodiment, the threshold is set to require a majority of the nodes in the replica set to agree on the next primary node. Other embodiments can use different threshold values.

Figure 7:
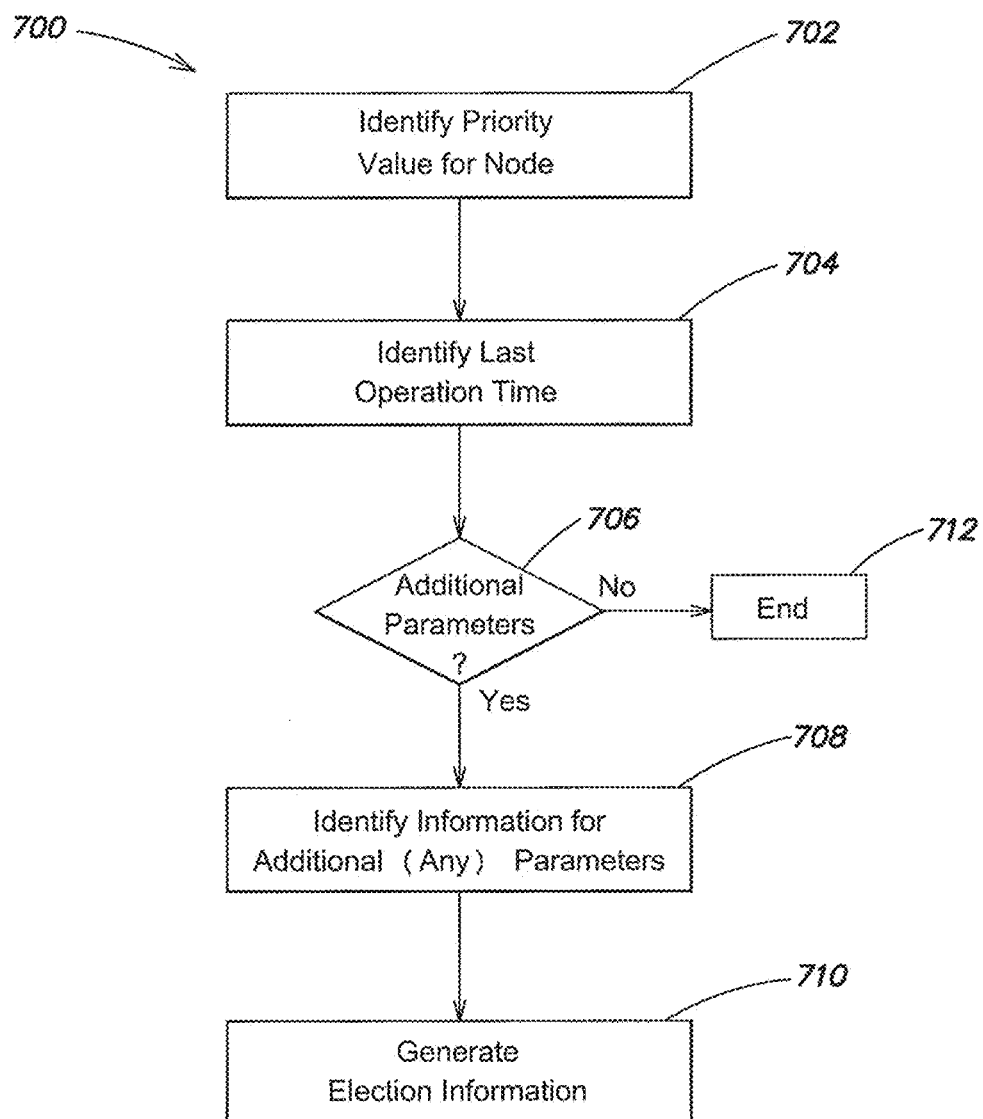
FIG. 7 illustrates an example process for determining election information for nodes in a replica set, according to one aspect of the present invention.

Further, the calculation of election values can include execution of election information generation sub-process. An example process 700 for determining election information is illustrated in FIG. 7. Process 700 begins with a node determining its priority from its local database at 702. In addition to priority value, a value associated with the node's last executed operation can be retrieved from the node's the local database at 704. In the event of equal priority value, the node with the freshest data will be elected (i.e. the node with the better operation value). In one example, the node with the smallest lag from the former primary node will generate the highest election value. Other embodiments can resolve additional parameters in determining its election value. For example, 706 YES, additional parameters can be included in the determination of a node's election information. In one embodiment, location of the node can be given a value depending on a preferred location and captured at 708. In another embodiment, nodes within the same rack as the former primary node can be favored over other nodes in the replica set. In yet another embodiment, location values can depend on geographic position, and a node with a different location than the current primary node can be favored. Hardware size of a node can be assigned a value in determining, an overall election value. Communication history can also be factored into election information for a particular node. For example, historic communication stability can improve a determined election value, and conversely a history of communication failure can lower an election value.

If an election information has been received from another node, and the present node has a lower priority value, and/or older data 706 NO no further evaluation is required and process 700 can terminate at 712. If no election information has been received, a node will aggregate election information for an attempt to self elect. In one example, the election value can include priority, last operation time, location, and hardware configuration. Other embodiments can use different values, different combination, or subsets of the identified parameters and generate election information/election values including those parameters at 710.

According to one embodiment, once a new primary system is elected, the replica set continues to response to read and write requests normally. Although for clients with connections established to the former primary node, errors will be returned as the client attempts to perform operations against the former primary. The errors can be returned based on an inability to communicate if, for example, a communication failure caused a new primary to be elected. Errors will also be returned if the former primary itself failed. Additionally, errors will also be returned if the former primary has been re-established as a secondary node. In response to a write request a former primary responds with an error message indicating that it is not primary. In one embodiment, the former primary can also be configured to respond with the address of its current primary. In one alternative, a client can discover a new primary in response to the error message. A new primary may need to be discovered any time the primary node changes from one node to another in a replica set. Discovery can occur by connecting to the entire replica set, as one example. In one alternative, the node returning a not primary error message can be configured to identify the node it believes is primary and if the node returning the error message does not have the address of the primary yet, that state can be indicated in a returned error message. The return of additional information with the not primary error message can be limited to systems that had the primary node responsibility within a configurable amount of time from receiving the request.

FIG. 8 illustrates an example process, 800, FIG. 8, for automatic recovery of a former primary node into the replica set. Processes for reintegration can be configured to execute in minimum time. In particular, reintegration can be performed to automatically remove uncommitted data to return to a database state from which normal replication operations can be performed to bring the former primary node to a synchronized state with the new primary node. By configuring the reintegration process to permit data loss, rather than on focusing on maintaining all written data, failed primary node can be efficiently reintegrated into a replica set. In one particular example, the reintegration of a failed primary node can take place without any administration. Further, in some examples, reintegration can occur without any conflict resolution logic. In one embodiment, eliminating conflict resolution and administration provides for streamlined and efficient reintegration of nodes into a replica set.

Example process 800 provides for reintegration of a former primary node into a replica set. Process 800 begins at step 802 with a former primary node executing a recovery process. Step 802 can include an act of the former primary node placing itself in a recovery state. Entering a recovery state can be used to trigger other processes, for example, an election process for a new primary. Step 802 may be the result of the former primary node returning to an operative condition. For example, power loss may have rendered the former primary node inoperable or networks failures prevented communication from the former primary to other nodes. Hardware failures may also cause outages. At step 802 the source of the failure event is rectified and the former primary node will attempt to participate in the replica set. Executing a recovery process at 802 can also include various state checks for the node. For example, upon start up any node may determine its last executed operation, and/or last communication time to determined if it should continue normal operation. Further a node can identify if it has lost power, was not gracefully shutdown, among other state checks that can be used to identify the need for recovery processing.

At 804, the former primary node detects the new primary node in the system and identifies a consistent state with the new primary system. In some examples, a new primary may not be elected yet, which requires execution of a wait operation and subsequent identification of the newly elected primary node. As discussed above, the former primary node can connect to the entire replica set to identify the new primary. In some alternatives, the former primary can receive information on the new primary from secondary nodes, etc. The former primary queries the operation log of the new primary to identify a point of consistency between the two databases. The query can be based on an operation time stamp, for example. In some examples, the query can identify the last operation received from the former primary. In one alternative, a query can identify the last operation in the new primary operation log with the former primary's identifier. Various queries can be used to identify, for example, a historical point of consistency between the former primary and the new primary. Additionally, the query employed may identify that no point of consistency exists. For example, the new primary may no longer have the operations in its operation log that would permit the former primary to rejoin the replica set. The former primary can be required to refresh its database to resolve that situation. Alternatively, the former primary can be configured to enter an off-line state that requires intervention.

According to one embodiment, at 804 the former primary node identifies point of consistency between its database and the database of the new primary. The former primary rolls back the operations that were executed against its database to achieve the point of consistency at 806. The data represented by each rolled back transaction is removed from the database. According to one embodiment, the data can be sacrificed to achieve zero administration reintegration. In some settings, the rolled back operations can be copied to the local database (a not replicated database). The locally tracked operations can be monitored for determining performance of the database for example. Further, it is realized that highly efficient reintegration can be achieved by permitting data loss, as no conflict resolution is required to reintegrate. The time to reintegrate the former primary becomes a function of identifying the point of consistency (which can be determined from one query), rolling back any subsequent transactions, and entering normal replication for new operations performed on the new primary.

According to one embodiment, the former primary node can be configured with an undo log to facilitate roll back of executed operations at 806. In some implementations, each node in a replica set can be configured with an undo log. In one example, the undo log is only made active for nodes that assume the primary role. As the primary role can migrate throughout the replica, each node capable of assuming the primary role is configured with an undo log capability.

Once the former primary node reaches the point of consistency, replication processes can bring the former primary in sync with the new primary. The former primary node can retrieve any new operations from the primary, execute the new operations, 808, and re-enter the replica set as an active secondary node at 810. In one example, the former primary node queries the new primary to determine any operations that need to be applied. In some examples, the query to indentify the point of consistency and the query to obtain new operations can occur at the same time.

Figure 12A:
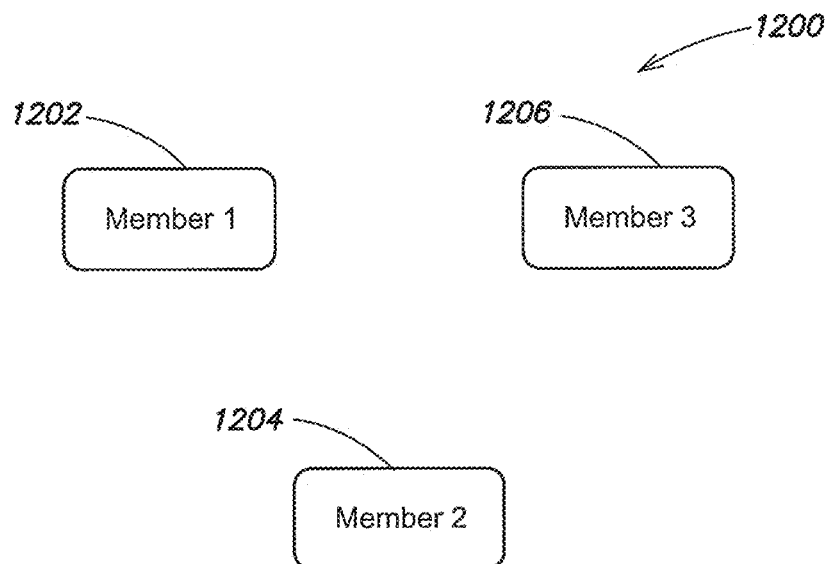
FIGS. 12A-F illustrate an example implementation of a replica set, and transitions of state of respective nodes during recovery and re-integration of a primary node.
Figure 12B:
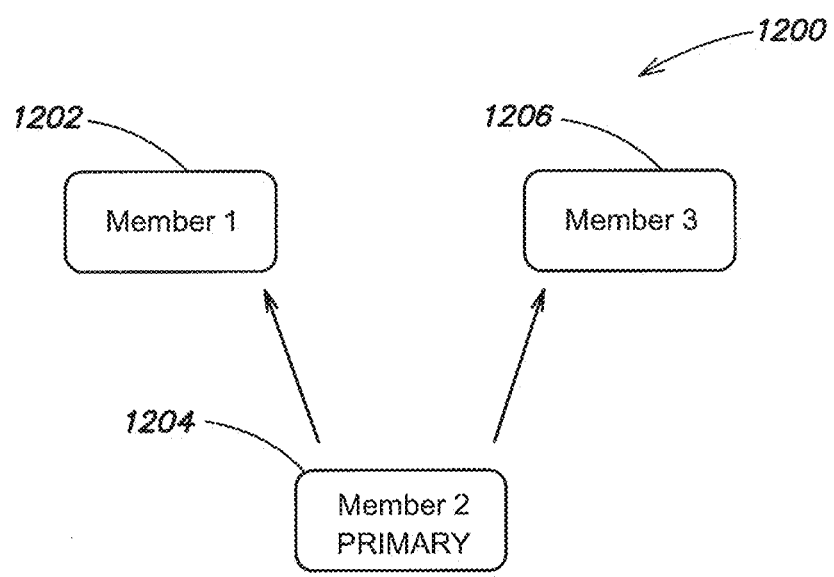
Figure 12C:
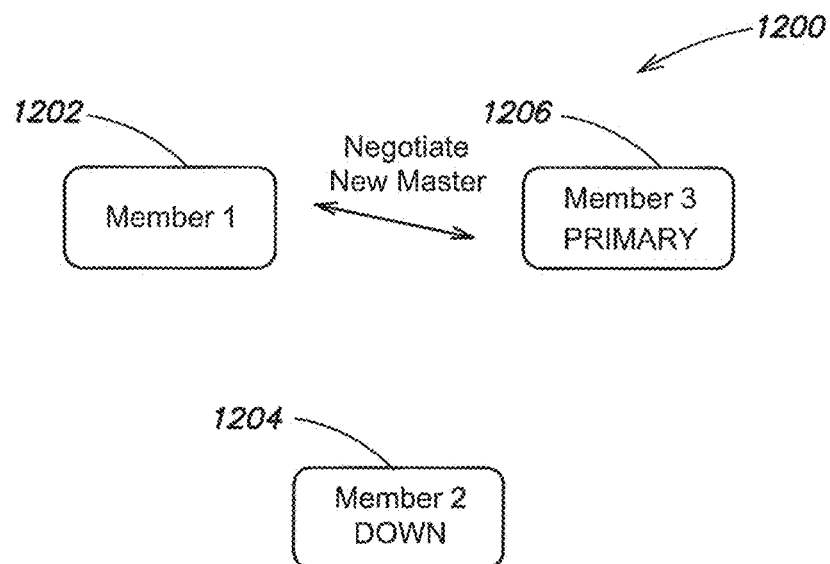
Figure 12D:
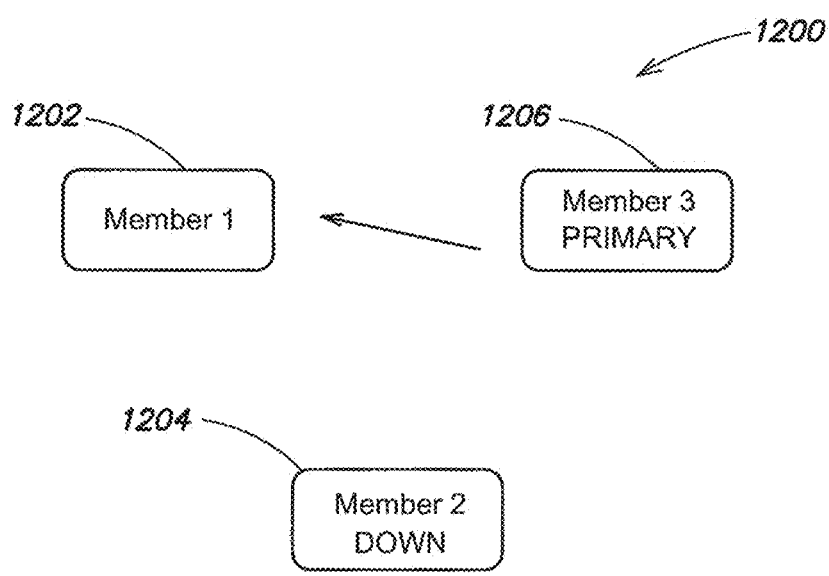

FIGS. 12A-F illustrate an example replica set, 1200, and resulting transitions of state for the members of the replica set during recovery and re-integration of a primary node. Shown in FIG. 12A are three nodes 1202-1206 configured to operate as a replica set. The replica set serves client requests for database operations. At initialization the replica set can be configured with a primary node 1204 that serves as a master node for secondary nodes 1202 and 1206 as shown in FIG. 12B. In some settings, the replica set can be initialized without a primary node. The members of the replica set are configured to promote one of the nodes as a primary node, and in response to initialization, the node 1204, can be selected as primary. FIG. 12C illustrates one example of a replica failure, and in particular, failure of the primary node 1204. The failure of 1204 triggers operations for set members 1202 and 1206 to identify and establish a new primary node for the replica set.

Figure 12E:
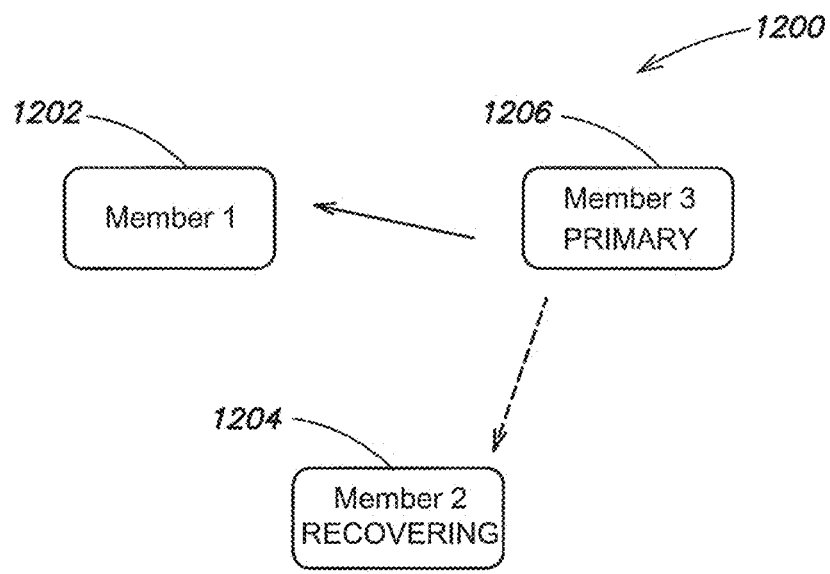
Figure 12F:
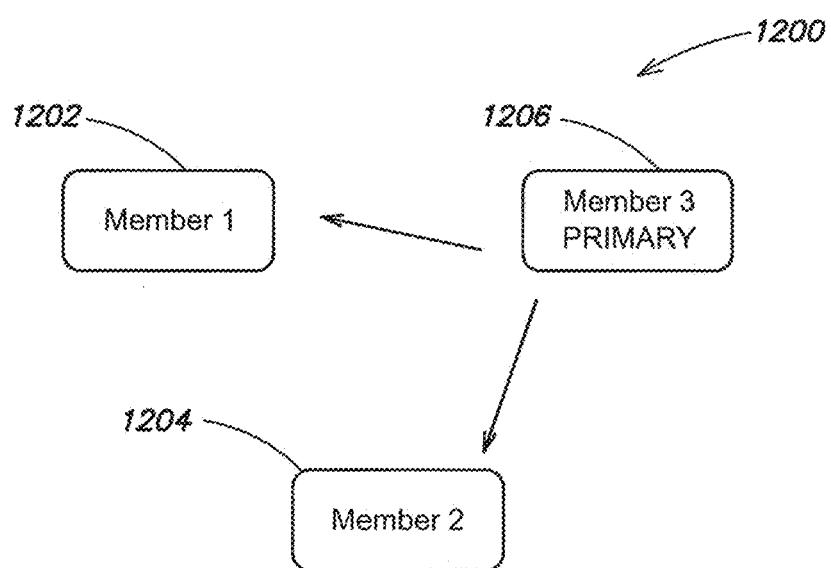

Various replica sets can be configured with one or multiple protocols for identifying and establishing a new primary node. For example, a replica set can be configured to perform processes 600, 700, and/or individual steps of those processes. Shown in FIG. 12D, node 1206 is identified and established as the new primary node for the replica set, 1200. FIG. 12E illustrates the former primary node 1204 coming back online. The return of a failed primary 1204, results in operations performed by 1204 to determine its state with respect to the replica set. The operations can determine that the node was down for any period of time and/or determine that the replica set has a new primary node. In response, former primary node, 1204 transitions its state to a recovery mode. During recovery, the failed primary 1204 attempts to identify a point of consistency between its database and the database hosted on the new primary mode. Typically, failed primary 1204, synchronizes its database by reversing transactions not present on the new primary node, until the failed primary node reflects the last transaction it replicated to the new primary node. Once the failed primary achieves a consistent state with respect to the new primary node, the failed primary can apply all the subsequent transactions that have been executed on the new primary.

In some settings, the processes of applying the subsequent transactions can be optimized, by providing for merging of transactions and other processes designed to minimize the number of operations required to bring the respective database to the same point. Upon reaching a consistent state with the new primary, the failed primary 1204, exits the recovery state and becomes another fully functional member of the replica sets as a secondary node shown in 12F.

In some settings, a replica set can be configured to perform various processes to re-integrate failed primary nodes and can, for example, execute process 800 and/or steps from process 800 to automatically re-integrate failed primary nodes. In some embodiments, each member of the replica set is configured to perform re-integration procedures, as the various members of the replica set can at any time during operation of the replica set, become the primary node and/or fail while primary.

A particular node can be configured with a number of procedures to identify that it was down or that it suffered a replication failure. For example, a node can track is communication status and upon exceeding a specified interval put itself into an offline state. In another example, the node can be configured to determine if it can only communicate with subsets of the entire replica set and/or a node can be configured to execute various queries on other nodes of the replica set. One query can establish how out of date a querying node is from the queried node. In another, a query can establish if another primary node exists in the replica set, among other options.

The various processes described herein can be configured to be executed on the systems shown by way of example in FIGS. 1-3 and FIGS. 12A-F. The systems shown can be programmed to execute the processes and/or functions described. Additionally, other computer systems can be specially configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database or a database replica, take on a primary node role, perform the operations associated with a secondary node role, an arbiter node, a passive node, a backup node, or perform the functions associated with the various nodes in a replica set, or a subset of the functions associated with the various nodes in a replica set according to various embodiments of the invention. Further, the computer systems can be configured to participate in election of new primary nodes and reintegrate failed primary nodes without administration. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to providing for processing of write requests at a primary node, permitting read requests on secondary nodes, generating operation log entries for executed operations, replicating asynchronously operations throughout a replica set, defining a cluster of nodes to participate in a replica set, monitoring communication, generating heartbeat communication messages, acknowledging replication operations based on a threshold number of nodes, automatically failing over a primary node role, participating in a primary node election processes, automatically reintegrating failed primary node(s) with no administration intervention, among other options. It should be appreciated, however, that the system may perform other operations and/or algorithms, including operations for generation operation transforms, merging operations, identifying replica status, saving replication state, configuring priority for a given node, weighting location of a node in primary election processing, weighting hardware, communication history, data state in election processing, etc. The operations and/or algorithms described herein can also be encoded as software executing on hardware that define a processing component, that can define portions of a general-purpose computer, reside on an individual general-purpose computer, and/or reside on multiple general-purpose computers.

Figure 9:
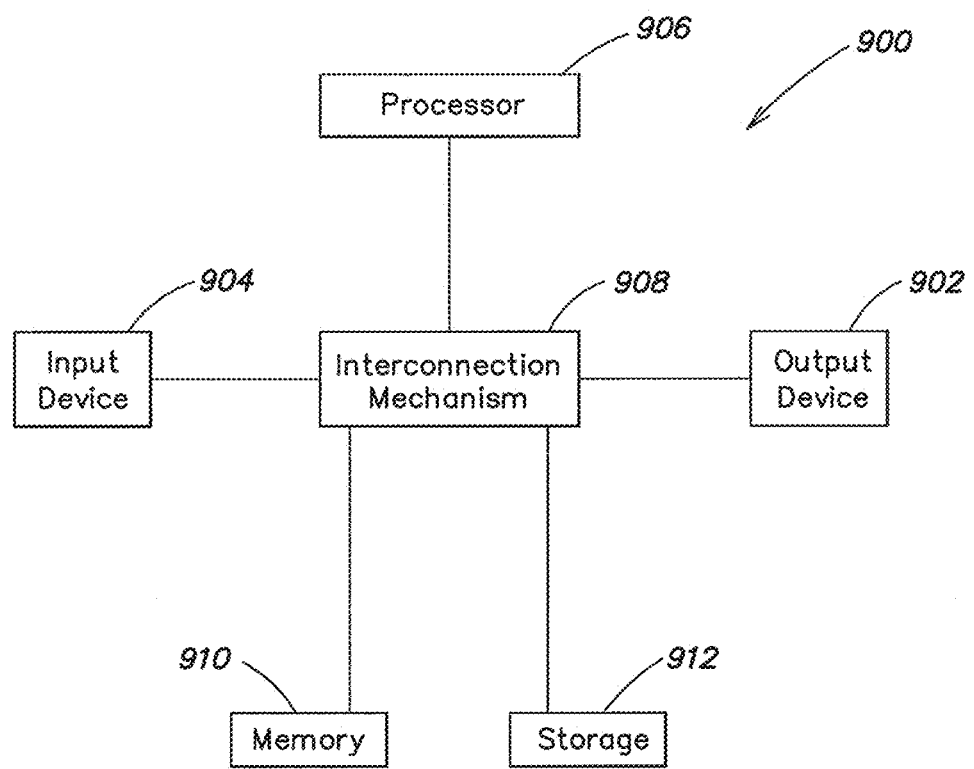
FIG. 9 is a block diagram of an example distributed database system on which various aspects of the present invention can be practiced.

FIG. 9 shows a block diagram of an example general-purpose computer system 900 on which various aspects of the present invention can be practiced. For example, various aspects of the invention can be implemented as specialized software executing in one or more computer systems including general-purpose computer systems 1104, 1106, and 1108 communicating over network 1102 shown in FIG. 11. Computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 10:
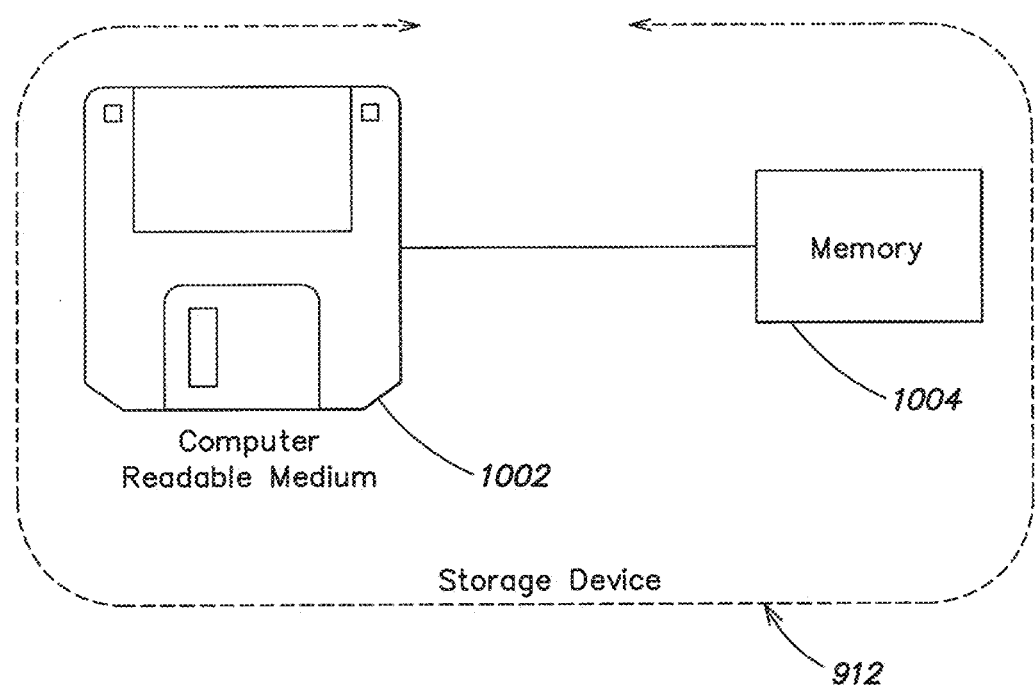
FIG. 10 is a block diagram of an example distributed database system on which various aspects of the present invention can be practiced.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 900. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs which receive and process client requests, interfacing with driver operations, performing operations associated with a primary node, a secondary nodes, an arbiter node and a backup node, configuring local non-replicated database instances, configuring replicated database instances with different indexes, for example. These systems can also permit client systems to request database write operations only at a primary node, restrict read operations to a primary node, permit read operations at secondary nodes, perform replication status operations, and restrict processing based on status, among other operations.

There can be other computer systems that perform functions such as hosting back up only replicas of a database, arbitrating election protocols, executing vote only rights in an election protocol, changing role from secondary to primary, changing role from primary to secondary, reintegrating into a replica set, among other functions. These systems can be distributed among a communication system such as the Internet. One such distributed network, as discussed below with respect to FIG. 11, can be used to implement various aspects of the invention.

Figure 11:
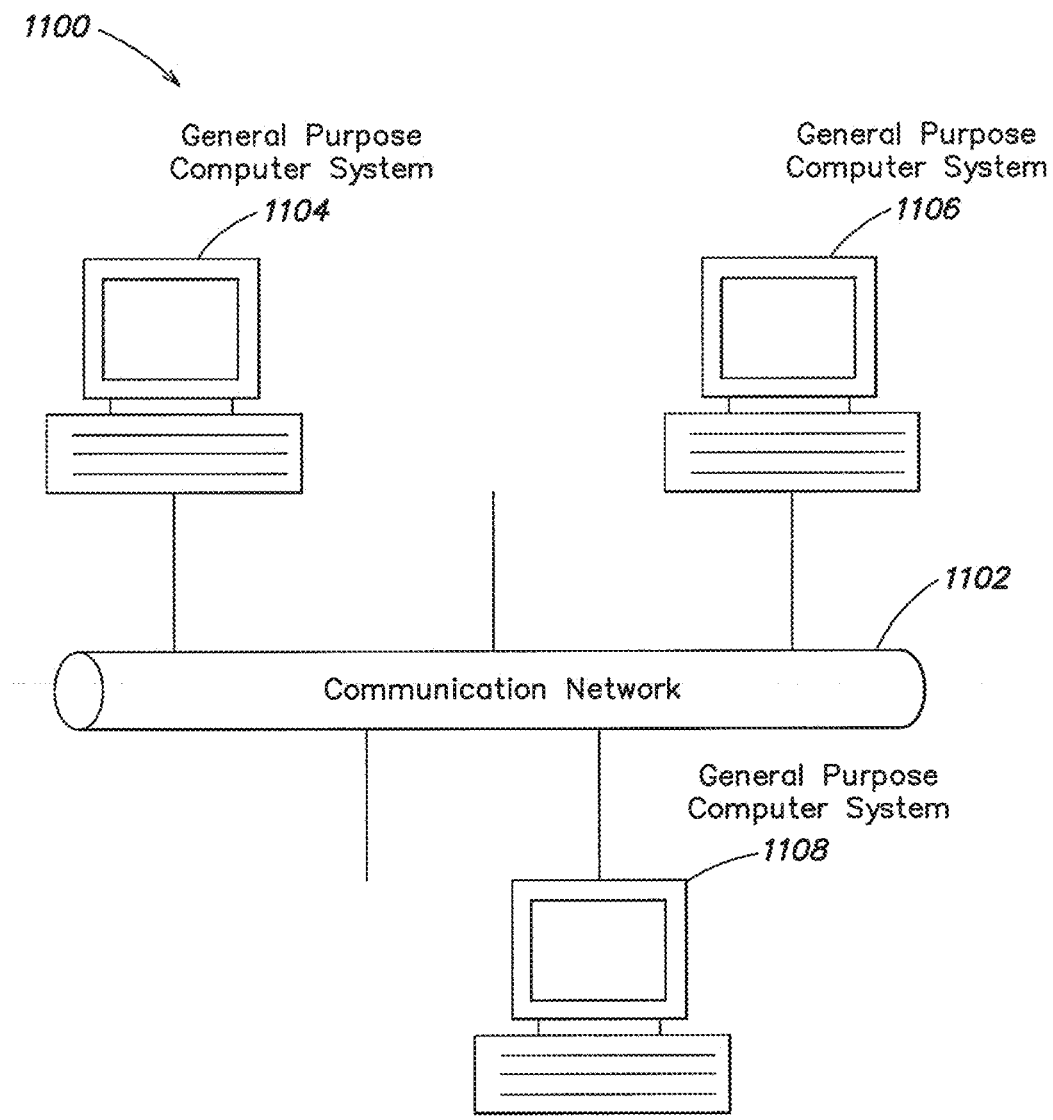
FIG. 11 is a block diagram of an example distributed database system on which various aspects of the present invention can be practiced.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured general-purpose computer systems distributed among a network 1102 such as, for example, the Internet. Such systems may cooperate to perform functions related to hosting a replicated databases, and/or automatic failover of primary node role, and/or reintegration of failed primary nodes. In an example of one such system, one or more computer systems 1104, 1106, and 1108 are configured to be nodes in a replica set. The replica set is configured to response to client requests for database access. In one setting access to the database occurs through various APIs and associated drivers. It should be understood that the one or more computer systems 1104, 1106, and 1108 can also be used to execute failover operations, determine replication state, participate in elections processes, etc. In one example, client computer systems can interface with computer systems 1104-1108 via an Internet-based interface.

In another example, a system 1104 can be accessed through a browser program such as the Microsoft Internet Explorer application program, Mozilla's FireFox, or Google's Chrome browser through which one or more websites can be accessed. Further, there can be one or more application programs that are executed on system 1104 that perform functions associated with responding to client interactions. For example, system 1104 may include one or more local databases that are not replicated for storing local configuration and state information on a given node. Local state information can be used to determined eligibility for responding to client request, eligibility for primary node responsibility, as examples.

Network 1102 may also include, as part of a system for asynchronous replication of a distributed database, one or more server systems, which can be implemented on general-purpose computers that cooperate to perform various functions including assigning roles to nodes within a replica set, responding to client database requests, generating operation logs, asynchronously replicating operations throughout a replica set, automatically migrating the primary node role in response to failure, and permitting reintegration of former primary nodes as secondary nodes in the replica set without administration. System 1100 may execute any number of software programs or processes on various hardware and the invention is not limited to any particular type or number of processes. Such processes can perform the various workflows associated with a system for asynchronously replicating distributed database operations.

Certain implementations of replication systems, can employ any number of the following elements. Each of the elements can be configured to perform the listed functions individually collectively and in various combination.

In one embodiment, an asynchronous replication system can include one or more of the following elements:
A primary node, wherein the primary is configured to perform any one or various combination of the following functions:
process all write requests from client systems
generate an operation log
commit operations once a threshold is established, which can be a majority of nodes in the replica set
generate undo log
monitor communication status
change state automatically in response to failure
assign a monotonically increasing ordinal to each operation
assign a node identifier to each operation
At least one secondary node, wherein the secondary node is configured to perform any one or various combination of the following functions:
replicates database from primary
from client perspective offers read only database
retrieves operations from primary/master
participate in quorums and consensus determination
respond to read request with most up-to-date data, which in some examples can include not set wide committed data
participate in election of new primary/master
monitor communication state
submit vote for new master based on most up-to-date data query other nodes for freshest data determination
attempt to elect self if freshest data
weight additional information in election determination, including for example any one or more of location information, rack information, communication history, reliability, and hardware configurations.
An arbiter node, wherein the arbiter node is configured to perform any one or various combination of the following functions:
participate as a vote only entity in a new primary election process
resolve conflicts in determining consensus for a new primary
And a backup node, wherein the backup node hosts a non-indexed replica of the database.

The asynchronous replication system can be configured to conduct a consensus protocol to elect a new primary system. The protocol can include one or more of the following elements:
priority data for quick election, wherein each node has a priority setting—highest priority is elected
resolve priority match with healthiest (most up-to-date) data, which in one example can be determined by querying a maximum operation lag time
status information to determine/confirm votes, which can be based on any or more of most up-to-date data, best location, weighted determination, most consistently available, and sufficiently distant locations
quorum establishment through voting and/or confirmation of votes
conflict resolution A voting example can include one or more of the following operations:
query all nodes for maxappliedoptime (reflects timeliness of data on any given node)
each node should try to elect itself where it has freshest maxappliedoptime and can see a majority of nodes
resolve tie by at least one of: delaying short random amount of time, check maxappliedoptime, and attempt election again; random selection; and use other status information to resolve tie.
a vote can include an identifier and the node's maxappliedoptime (Elect (selfid, maxoptime) communicate to other nodes
confirm vote if receiving node maxoptime<=maxoptime and reject vote if recipient maxoptime>
confirmation primary when a majority of nodes agree In another example, a voting process can include an act of automatically responding No to all subsequent vote requests after a Yes (including a self elect vote) for a given period of time. In one implementation, the period is set for 1 minute.

The asynchronous replication system can also be configured to automatically reintegrate a filed primary node into a replica set. A reintegration protocol can include one or more of the following elements:
identification of consistent state of the database
roll back of failed primary system to consistent state, wherein the roll back operation can include for each operation in operation log that does not exist at the new primary: remove from the operation from the operation log and re-sync the document/data/object in question by a query to the new primary for the document/data/object, delete document/data/object if not existent at primary
Apply any subsequent operations from new primary

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer-implemented method for managing primary responsibility in a distributed database system, the method comprising the acts of:
establishing, by at least one hardware-based processor, at least one primary node having a primary node role within a plurality of nodes, wherein the plurality of nodes comprise the distributed database system and the distributed database system provides responses to database requests from client computer systems;
establishing, by the least one hardware-based processor, a plurality of secondary nodes having a secondary node role, wherein each secondary node is associated with a primary node and hosts a replica of the primary node's database;
replicating, by the least one hardware-based processor, from the at least one primary node executed write operations to secondary nodes associated with the at least one primary node under a default consistency model; and
automatically recovering, by the least one hardware-based processor, the primary node role in the distributed database system in response to a failure of the at least one primary node, wherein the act of automatically recovering includes:
establishing one of the plurality of secondary nodes as a new primary node; and
establishing a point of consistency within the database between the new primary node and remaining secondary nodes as a new current state of the database; and
executing, by the least one hardware-based processor, at least a first write operation at the at least one primary node, the first write operation received from a first user,
replicating, by the least one hardware-based processor, the executed operation to the plurality of secondary nodes under the default consistency model;
responsive to identifying, by the least one hardware-based processor, that at least a second write operation communicated from a second user includes a user requirement within the write operation specifying that at least the second write operation is to be executed with additional requirements over the default consistency model, modifying, by the least one hardware-based processor, replication of the write operation to include the additional consistency requirements.

2. The method according to claim 1, wherein establishing the plurality of secondary nodes having the secondary node role, includes configuring the plurality of secondary nodes to receive replicated operations from the at least one primary node according to a data consistency model.

3. The method according to claim 1, wherein method further comprises an act of providing for strong consistency or immediate consistency in the distributed database system.

4. The method according to claim 1, wherein the act of automatically recovering the at least one primary node responsibility further comprises the acts of:
   detecting by at least one node in the plurality of nodes a replication failure;
   electing automatically, in response to the act of detecting, a new primary node from the plurality of secondary nodes;
   establishing for the new primary node at least one secondary node to replicate operations; and
   synchronizing a state of a respective database hosted on each of the secondary nodes with a state of the database hosted on the new primary node.

5. The method according to claim 4, further comprising an act of restoring the original primary node to the database system, wherein the act of restoring includes an act of identifying a consistent state in the database hosted on the original primary node and the new primary node.

6. The method according to claim 5, wherein the act of identifying the consistent state includes an act of identifying a database state of the new primary node where the database state reflects a last committed write operation received from the original primary node.

7. The method according to claim 6, further comprising an act of applying any transactions from the database hosted on the new primary node to the database hosted on the original primary node.

8. The method according to claim 4, wherein the act of electing the new primary node includes an act of establishing a consensus within the plurality of nodes.

9. The method according to claim 8, wherein the act of establishing a consensus includes an act of requiring a majority of the plurality of nodes to agree on the new primary node.

10. The method according to claim 1, wherein the act of replicating from the at least one primary node includes an act of committing a write operation in response to an acknowledgement of the write operation from the majority of nodes responsible for the written data.

11. The method according to claim 1, wherein the act of replicating from the at least one primary node the write operations to the plurality of nodes, includes an act of committing the write operation in response to an acknowledgement of the write operation from a threshold number of the nodes responsible for the written data.

12. A system for managing replication responsibility in a distributed database environment comprising a plurality of nodes, the system comprising:
   at least one hardware-based processor operatively connected to a memory;
   a role component, executed by the at least one processor, configured to establish a role associated with each node in a plurality of nodes, wherein the role component is configured to establish at least one primary node with a primary role and at least one secondary node with a secondary role;
   a replication component, executed by the at least one processor, configured to replicate write operations performed on the at least one primary node to the at least one secondary node under a default consistency model; and
   a recovery component, executed by the at least one processor, configured to:
      automatically establish a new primary node in the distributed database system in response to a replication failure on the original at least one primary node;
      establish one of the at least one secondary node as the at least one primary node; and
   wherein the replication component is further configured to:
      replicate an executed operation to the plurality of secondary nodes under the default consistency model; and
      modify replication of a second write operation to include additional consistency requirements, responsive to identifying that the second write operation includes a user requirement within the write operation specifying that the second write operation is to be executed with additional requirements over the default consistency model.

13. The system according to claim 12, further comprising a durability component configured to commit a write operation in response to replication of the write operation to a threshold number of the nodes responsible for the written data.

14. The system according to claim 12, wherein the threshold number of the nodes responsible for the written data comprises a majority of the nodes responsible for the written data.

15. The system according to claim 12, wherein the majority of nodes responsible for the written data include the primary node and at least two secondary nodes.

16. The system according to claim 12, wherein the recovery component further comprises:
   a status component configured to monitor replication status in the distributed database;
   an election component configured to automatically establish a new node with the primary role in response to detecting a replication failure; and
   a synchronization component configured to synchronize a database hosted on the at least one node with the secondary role and a database hosted on the new primary node.

17. The system according to claim 16, wherein the election component is further configured to establish the new node with the primary role based on evaluation of election criteria, including at least one of a state of a node's data, a geographic location, a rack position, a processing capability, or a hardware capability.

18. The system according to claim 12, where the system is configured to maintain strong consistency in the distributed database.

19. A system for managing replication responsibility in a distributed database environment comprising a plurality of nodes, the system comprising:
   at least one processor operatively connected to a memory, the at least one processor when running is configured to execute a plurality of system components, wherein the plurality of system components comprise:
      a role component configured to establish a role associated with a plurality of nodes, wherein the role component is configured to establish a primary node with a primary role and at least a plurality of secondary nodes with a secondary role; and
      a replication component configured to:
         replicate write operations performed on the primary node to the plurality of secondary nodes such that all write operations are executed at least under a default replication consistency model for data replication in the distributed database;

identify that at least one write operation includes a user requirement such that the at least one write operation is executed with additional replication consistency requirements over the default replication consistency model;

record replication status that reflects that the at least one write operation has occurred for the at least one write from the plurality of secondary nodes; and confirm the at least one write operation responsive to determining that at least one write operation has been replicated to a threshold number of the plurality of secondary nodes.

20. The system according to claim 19, wherein the plurality of secondary nodes are configured to return an acknowledgement of a replicated write to the at least one primary node, responsive to an indication that the write has been submitted with the user requirement that the write operation includes additional requirements over the default replication consistency model.

21. The system according to claim 19, wherein the replication component is further configured to cause the plurality of secondary nodes to record an identifier for the primary node and a monotonically increasing value assigned to each replicated operation.

22. The system according to claim 19, wherein the default replication consistency model comprises an eventual consistency mode such that responsive to write operations ceasing replicas of the distributed database eventually become consistent.

23. The system according to claim 19, wherein the plurality of secondary nodes are configured to return an acknowledgement of a replicated write to the at least one primary node, responsive to an indication that the write has been submitted with the user requirement that the write operation includes additional requirements over the default replication consistency model.

24. The system according to claim 19, wherein the replication component is further configured to cause the plurality of secondary nodes to record an identifier for the primary node and a monotonically increasing value assigned to each replicated operation.

25. A method for managing replication responsibility in a distributed database environment comprising a plurality of nodes, the method comprising:

establishing, by at least one hardware based processor, a role associated with a plurality of nodes, wherein the role component is configured to establish a primary node with a primary role and at least a plurality of secondary nodes with a secondary role; and replicating, by the at least one hardware based processor, write operations performed on the primary node to the plurality of secondary nodes such that all write operations are executed at least under a default replication consistency model for data replication in the distributed database;

identifying, by the at least one processor, that at least one write operation includes a user requirement such that the at least one write operation is executed with additional replication consistency requirements over the default replication consistency model;

recording replication status that reflects that the at least one write operation has occurred for the at least one write from the plurality of secondary nodes; and confirming the at least one write operation responsive to determining that at least one write operation has been replicated with the additional replication consistency requirements.

* * * * *